United States Patent [19]

Robeson

[11] 4,259,458

[45] Mar. 31, 1981

[54] POLYARYLATE CONTAINING BLENDS

[75] Inventor: Lloyd M. Robeson, Whitehouse Station, N.J.

[73] Assignee: Union Carbide Corporation, New York, N.Y.

[21] Appl. No.: 65,276

[22] Filed: Aug. 9, 1979

[51] Int. Cl.$^3$ .............................................. C08L 61/04
[52] U.S. Cl. ........................................ 525/68; 525/63; 525/69; 525/132; 525/151; 525/165; 525/167; 525/173; 525/176; 525/177; 525/390; 525/397; 525/416; 525/439; 525/440; 525/444; 525/445
[58] Field of Search ..................... 525/83, 68, 69, 132, 525/151, 165, 167, 173, 176, 177, 390, 397, 416, 438, 439, 440, 444, 445

[56] References Cited

U.S. PATENT DOCUMENTS

| | | | |
|---|---|---|---|
| 4,013,613 | 3/1977 | Abolins et al. | 525/444 X |
| 4,064,196 | 12/1977 | Hazama et al. | 525/444 X |

FOREIGN PATENT DOCUMENTS 53-92861  8/1978  Japan ........................................ 525/444

*Primary Examiner*—J. Ziegler
*Attorney, Agent, or Firm*—Donald M. Papuga

[57] ABSTRACT

Described herein are molding compositions comprising a blend of a polyarylate, a polyester, and at least one thermoplastic polymer selected from the group consisting of an aromatic polycarbonate, a styrene resin, an alkyl acrylate resin, a polyurethane, a vinyl chloride polymer, a poly(aryl ether), a copolyetherester block polymer or a polyhydroxyether. These blends have excellent compatability and can be molded into a variety of articles.

37 Claims, No Drawings

POLYARYLATE CONTAINING BLENDS

BACKGROUND OF THE INVENTION

This invention is directed to a molding composition comprising a blend of a polyarylate, a polyester, and at least one thermoplastic polymer selected from the group consisting of an aromatic polycarbonate, a styrene resin, an alkyl acrylate resin, a polyurethane, a vinyl chloride polymer, a poly(aryl ether), a copolyetherester block polymer or a polyhydroxyether.

Polyarylates are aromatic polyesters derived from a dihydric phenol, particularly 2,2-bis-(4-hydroxyphenyl)propane (also identified as Bisphenol-A) and an aromatic dicarboxylic acid, particularly mixtures of terephthalic and isophthalic acids.

Polyarylates are high temperature, high performance thermoplastic polymers with a good combination of thermal and mechanical properties. They have a high continuous use temperature of about 130° C., and good unnotched toughness, with a pendulum impact value of greater than 300 ft. lbs./in.$^3$. Additionally, polyarylates have inherent flammability and combustion resistance as well as good weatherability. The polyarylates have good melt stability at high temperatures and good color retention. They also have good processability which allows them to be molded into a variety of articles.

Polyarylates have been blended with other resin systems such as ABS resin (U.S. Pat. No. 3,792,118), polycarbonate resins (U.S. Pat. No. 3,792,115), polyurethane resins, methyl methacrylate resins, etc. The blending of resins is often used to cover a defect of one resin with another resin. For example, a resin having a low heat distortion temperature may be blended with a resin having a high heat distortion temperature. However, this method is generally accompanied by unfavorable effects on other properties such as deterioration of mechanical properties or an inferior surface of the resulting injection molded resin.

Specifically, when polyarylates are blended with resins such as thermoplastic polyurethanes, vinyl chloride polymers, methyl methacrylate resins, etc. several problems result. Polyarylates have high viscosities which require a high molding temperature which exceeds the temperature stability limit of the other resin which is blended with the polyarylate. Thus, when this blend is molded deterioration of the resin occurs. This is observed particularly with blends of polyarylate and vinyl chloride polymers. Additionally, when there is an extreme viscosity difference between the high viscosity polyarylate and the other polymer severe surface irregularities (e.g. jetting) are observed when these blends are injection molded. This is observed especially when polyarylate is blended with, for example, ABS resins and poly(methyl methacrylate) resins. Further, the extremely high viscosity of polyarylates prevents a uniform product from being obtained when the polyarylate is blended with a resin having a lower viscosity by conventional polymer mixing techniques, i.e., extrusion or Banbury type melt mixing. The non-uniform blend will not weather as well as a uniform blend of the resins nor will it have an acceptable balance of properties.

It has now been found that the addition of a polyester derived from an aliphatic or cycloaliphatic diol, or mixtures thereof, and an aromatic dicarboxylic acid to a blend of a polyarylate and at least one thermoplastic polymer selected from the group consisting of an aromatic polycarbonate, a styrene resin, an alkyl acrylate resin, a vinyl chloride polymer, a poly(aryl ether), a copolyetherester block polymer or a polyhydroxyether, produces a blend which has excellent surface appearance and can be easily molded without deterioration.

Additionally, it has been found that the addition of polyarylate to a blend of the polyester and the thermoplastic polymer improves the weatherability of the blend, i.e., the mechanical properties of the blends are retained after exposure to conditions of ultraviolet light and moisture. The presence of the polyester resin in the blend provides a uniform blend and the resins can be blended using conventional polymer mixing techniques. The presence of the polyester resin in the blend does not interfere with the improving effect the polyarylate has on the weatherability of the blend.

The blends of the present invention have excellent mechanical properties, better than the properties of a binary blend of polyarylate and a thermoplastic polymer. This is unexpected and allows heretofore unusable binary systems of polyarylate resin and thermoplastic polymer to be molded into articles.

DESCRIPTION OF THE INVENTION

According to the present invention there is provided a molding composition comprising a blend of:
(a) a polyarylate derived from at least one dihydric phenol and at least one aromatic dicarboxylic acid,
(b) a polyester derived from an aliphatic or cycloaliphatic diol, or mixtures thereof, and at least one aromatic dicarboxylic acid, and
(c) at least one thermoplastic polymer selected from the group consisting of an aromatic polycarbonate, a styrene resin, an alkyl acrylate resin, a polyurethane, a vinyl chloride polymer, a poly(aryl ether), a copolyetherester block polymer or a polyhydroxyether.

Polyarylates

The polyarylates of this invention are derived from a dihydric phenol and an aromatic dicarboxylic acid.

A particularly desirable dihydric phenol is of the following formula:

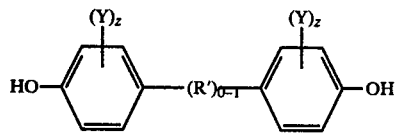

wherein Y is selected from alkyl groups of 1 to 4 carbon atoms, chlorine or bromine, z has a value of from 0 to 4, inclusive, and R' is a divalent saturated aliphatic hydrocarbon radical, particularly alkylene and alkylidene radicals having from 1 to 3 carbon atoms, and cycloalkylene radicals having up to and including 9 carbon atoms. The preferred dihydric phenol is Bisphenol-A. The dihydric phenols may be used individually or in combination.

Additionally, said dihydric phenols can be used in combination with a dihydric phenol of the following formula:

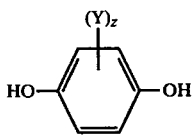

wherein Y and z are as previously defined.

Suitable aromatic dicarboxylic acids include terephthalic acid, isophthalic acid, naphthalene dicarboxylic acids, and mixtures thereof, as well as alkyl substituted homologs of these carboxylic acids wherein the alkyl groups contain from 1 to about 4 carbon atoms, and acids containing other inert substituents such as halides, alkyl or aryl ethers, and the like.

The polyarylates contain from about 95 to 0 mole percent of terephthalic acid and from about 5 to 100 mole percent of isopthalic acid. More preferably, the polyarylates contain a mixture of from about 30 to about 70 mole percent of terephthalic acid and from about 70 to about 30 mole percent of isophthalic acid. A polyarylate containing a mixture of 50 mole percent of terephthalic acid and 50 mole percent of isophthalic acid is most preferred.

The polyarylates of the present invention can be prepared by any of the well known prior art polyester forming reactions, such as the reaction of the acid chlorides of the aromatic dicarboxylic acids with the dihydric phenol, the reaction of the diaryl esters of the aromatic dicarboxylic acids with the dihydric phenols, and the reaction of the aromatic diacids with diester derivatives of the dihydric phenol. These processes are described in, for example, U.S. Pat. Nos. 3,317,464; 3,948,856; 3,780,148; 3,824,213 and 3,133,898.

These polyarylates have a reduced viscosity of from about 0.4 to about 1.0 as measured in p-chlorophenol at 49° C. (0.2 g/100 ml.).

Polyesters

The polyesters which are suitable for use herein are derived from an aliphatic or cycloaliphatic diol, or mixtures thereof, containing from 2 to about 10 carbon atoms and at least one aromatic dicarboxylic acid. The polyesters which are derived from an aliphatic diol and an aromatic dicarboxylic acid have repeating units of the following general formula:

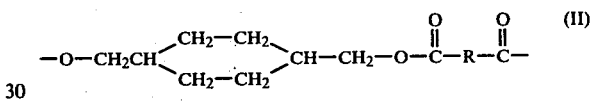

(I)

wherein n is an integer of from 2 to 4.

The preferred polyester is poly(ethylene terephthalate).

Also contemplated herein are the above polyesters with minor amounts, e.g., from 0.5 to about 2 percent by weight, of units derived from aliphatic acids and/or aliphatic polyols, to form copolyesters. The aliphatic polyols include glycols such as poly(ethylene glycol). These can be made following the teachings of, for example, U.S. Pat. Nos. 2,465,319 and 3,047,539.

Among the units which can be present in the copolyesters are those derived from aliphatic dicarboxylic acids, e.g., of up to about 50 carbon atoms, including cycloaliphatic straight and branched chain acids, such as adipic acid, cyclohexanediacetic acid, dimerized $C_{16}$–$C_{18}$ unsaturated acids (which have 32 to 36 carbon atoms), trimerized acids, and the like. In addition, there can be minor amounts of units derived from aliphatic glycols and polyols, e.g., of up to about 50 carbon atoms preferably from 2 to about 20 carbon atoms and these include, among others, propylene glycol, glycerol, diethylene glycol, triethylene glycol and the like.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with the aromatic dicarboxylic acid so as to produce a polyester having recurring units having the following formula:

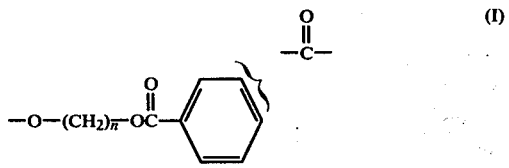

(II)

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids indicated by R in formula II, include isophthalic or terephthalic acid, 1,2-di(p-carboxyphenyl) ethane, 4,4'-dicarboxydiphenyl ether, etc., and mixtures of these. All of these acids contain at least one aromatic nucleus. Fused rings can also be present such as in 1,4- or 1,5-naphthalene-dicarboxylic acids. The preferred dicarboxylic acid is terephthalic acid or mixtures of terephthalic and isophthalic acid.

A preferred polyester may be derived from the reaction of either the cis- or trans-isomer (or a mixture thereof) of 1,4-cyclohexanedimethanol with a mixture of iso- and terephthalic acids. These polyesters have repeating units of the formula:

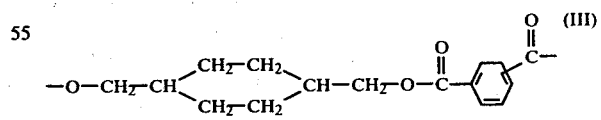

(III)

Another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following formula:

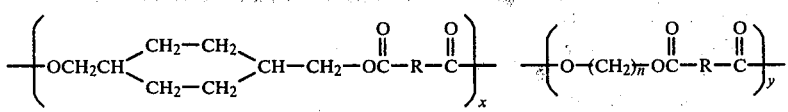

wherein the cyclohexane ring is selected from the cis- and trans-isomers thereof, R is as previously defined, n is an integer of 2 to 4, the x units comprise from about 10 to about 90 percent by weight and the y units comprise from about 10 to about 90 percent by weight.

The preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

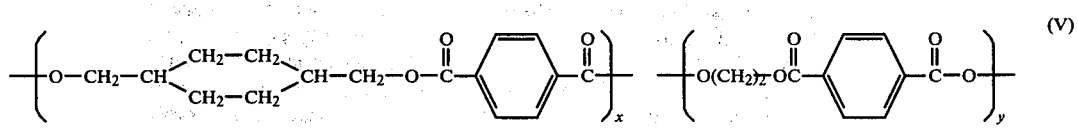

wherein x and y are as previously defined.

Blends of said copolyesters and polyarylates are described in U.S. Pat. application Ser. No. (12,396) of L. M. Robeson, titled "Polyarylate Blends with Copolyesters" and filed on June 18, 1979.

This Patent Application Ser. No. (12,396) describes blends of polyarylates derived from a dihydric phenol and an aromatic dicarboxylic acid and a copolyester derived from a cyclohexanedimethanol, an alkylene glycol and an aromatic dicarboxylic acid, as having improved processability, weatherability and impact properties.

The polyesters as described herein are either commercially available or can be produced by methods well known in the art such as those set forth in, for example, U.S. Pat. No. 2,901,466.

The preferred polyesters are poly(1,4-cyclohexanedimethanol tere/iso-phthalate) and a copolyester of 1,4-cyclohexanedimethanol, ethylene glycol and terephthalic acid and poly(ethylene terephthalate) as previously described.

The polyesters used herein have an intrinsic viscosity of at least about 0.4 to about 2.0 dl/g. measured in a 60:40 phenol/tetrachloroethane mixture or similar solvent at 23°-30° C. The intrinsic viscosity is defined by the following relationship:

$$[\eta] = \lim_{C \longrightarrow 0} \left( \frac{\eta SP}{C} \right)$$

wherein ηSP=specific viscosity, and C=the concentration in dl/g.

Thermoplastic Polymers

The thermoplastic polymers suitable for use in this invention are selected from the group consisting of an aromatic polycarbonate, a styrene resin, an alkyl acrylate resin, a polyurethane, a vinyl chloride polymer, a poly(aryl ether), a copolyetherester block polymer, a polyhydroxyether, or mixtures thereof.

A. Polycarbonate

The thermoplastic aromatic polycarbonates that can be employed herein are homopolymers and copolymers and mixtures thereof which have an intrinsic viscosity of 0.40 to 1.0 dl./g. as measured in methylene chloride at 25° C. that are prepared by reacting a dihydric phenol with a carbonate precursor. Typical of some of the dihydric phenols that may be employed in the practice of this invention are bisphenol-A (2,2-bis(4-hydroxyphenyl) propane), bis(4-hydroxyphenyl) methane, 2,2-bis(4-hydroxy-3-methylphenyl) propane, 4,4-bis(4-hydroxyphenyl) heptane, 2,2-(3,5,3',5'-tetrachloro-4,4'-dihydroxydiphenyl) propane, 2,2-(3,5,3',5'-tetrabromo-4,4'-dihydroxydiphenyl)-propane, (3,3'-dichloro-4,4'-dihydroxydiphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or inter-polymer rather than a homopolymer is desired for use in the preparation of the aromatic carbonate polymers of this invention.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc. or mixtures thereof. The haloformates suitable for use herein include bis-haloformates of dihydric phenols (for example, bischloroformates of bisphenol-A, of hydroquinone, etc.) or glycols (for example, bishaloformates of ethylene glycol, neopentyl glycol, polyethylene glycol, etc.). While other carbonate precursors will occur to those skilled in the art, carbonyl chloride, also known as phosgene, is preferred.

The aromatic carbonate polymers of this invention may be prepared by using phosgene or a haloformate and by employing a molecular weight regulator, an acid acceptor and a catalyst. The molecular weight regulators which can be employed in carrying out the process of this invention include monohydric phenols such as phenol, para-tertiarybutylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The polycarbonates can be prepared in a one-phase (homogeneous solution) or two-phase (interfacial) systems when phosgene or a haloformate are used. Bulk reactions are possible with the diarylcarbonate precursors.

B. Styrene Resin

The styrene resins suitable for use herein are ABS type polymers, the molecules of which consist of two or more polymeric parts of different compositions that are bonded chemically. The polymer is preferably prepared by polymerizing a conjugated diene such as butadiene or a conjugated diene with a monomer copolymerizable therewith such as styrene to provide a polymeric backbone. After formation of the backbone, at least one grafting monomer and preferably two are polymerized in the presence of the prepolymerized backbone to obtain the graft polymer.

The backbone polymer, as mentioned, is preferably a conjugated diene polymer such as polybutadiene polyisoprene, or a copolymer such as butadiene-styrene, butadiene-acrylonitrile, or the like.

The specific conjugated diene monomers normally utilized in preparing the backbone of the graft polymer portion of the blends of this invention are generically described by the formula:

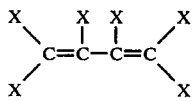

wherein X may be selected from the group consisting of hydrogen, alkyl groups containing from one to five carbon atoms, chloro and bromo. Examples of dienes that may be used are butadiene; isoprene; 1,3-heptadiene; methyl-1,3-pentadiene; 2,3-dimethyl-1,3-butadiene; 1,3-pentadiene; 2-methyl-3-ethyl-1,3-butadiene; 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. The preferred conjugated diene utilized herein is butadiene.

One monomer of group of monomers that may be polymerized in the presence of the prepolymerized backbone are preferably monovinylaromatic hydrocarbons. The monovinyl-aromatic monomers utilized are generically described by the formula:

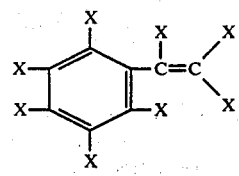

wherein X may be selected from the group consisting of hydrogen, alkyl groups containing from one to five carbon atoms, chloro and bromo. Examples of the monovinylaromatic compounds and substituted monovinylaromatic compounds that may be used are styrene and other vinyl substituted aromatic compounds including alkyl-, cycloalkyl-, aryl-, alkaryl-, aralkyl-, alkoxy-, aryloxy-, and other substituted vinylaromatic compounds. Examples of such compounds are 3-methylstyrene; 3,5-diethylstyrene and 4-n-propylstyrene, α-methylstyrene, α-methyl vinyltoluene, α-chlorostyrene, α-bromo-styrene, dichlorostyrene, dibromostyrene, tetra-chlorostyrene, mixtures thereof, and the like. The preferred monovinylaromatic hydrocarbons used herein are styrene and/or α-methylstyrene.

A second group of monomers that may be polymerized in the presence of the prepolymerized backbone are acrylonitrile, substituted acrylonitrile and/or acrylic acid esters exemplified by acrylonitrile and alkyl acrylates such as methyl methacrylate. The acrylonitrile, substituted acrylonitrile, or acrylic acid esters are described generically by the formula:

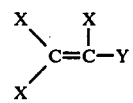

wherein X may be selected from the group consisting of hydrogen, alkyl groups containing from one to five carbon atoms, chloro and bromo and Y is selected from the group consisting of cyano and carbalkoxy wherein the alkyl group of the carbalkoxy group contains from one to about twelve carbon atoms. Examples of monomers of this description are acrylonitrile, ethacrylonitrile, methacrylonitrile, α-chloroacrylonitrile, β-chloroacrylonitrile, α-bromoacrylonitrile, and β-bromoacrylonitrile, methyl acrylate, methyl methacrylate, ethyl acrylate, butyl acrylate, propyl acrylate, isopropyl acrylate, isobutyl acrylate, mixtures thereof and the like. The preferred acrylic monomer used herein is acrylonitrile and the preferred acrylic acid esters are ethyl acrylate and methyl methacrylate.

In the preparation of the graft polymer, the conjugated diolefin polymer or copolymer exemplified by 1,3-butadiene polymer or copolymer comprises from about 50% by weight to about 5% by weight of the total graft polymer composition and the monomers polymerized in the presence of the backbone exemplified by styrene and acrylonitrile comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition and the monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the compositions used in preparing the graft polymer, a certain percentage of the composition may be an α-methylstyrene-acrylonitrile copolymer. Also, there are occasions where a copolymer, such as α-methylstyrene-acrylonitrile, is added to the graft polymer copolymer blend. When the graft polymer-copolymer blend is referred to herein, it is meant optionally to include at least one copolymer blended with the graft polymer. It is contemplated in this invention that the graft polymer composition may contain up to 90% of free copolymer.

Optionally, the elastomeric backbone may be an acrylate rubber such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

C. Alkyl Acrylate Resin

The alkyl acrylate resin used in the present invention includes a homopolymer of methyl methacrylate (i.e. polymethyl methacrylate) or a copolymer of methyl methacrylate with a vinyl monomer (e.g. acrylonitrile, N-allylmaleimide, N-vinyl maleimide, or an alkyl acrylate or methacrylate in which the alkyl group contains from 1 to 8 carbon atoms such as methyl acrylate, ethyl acrylate, butyl acrylate, ethyl methacrylate and butyl methacrylate). The amount of methyl methacrylate is not less than 70% by weight of this copolymer resin. The methyl methacrylate resin may have a reduced viscosity of from 0.1 to 2.0 dl/g in a 1% chloroform solution at 25° C.

The alkyl acrylate resin may be grafted onto an unsaturated elastomeric backbone such as polybutadiene, polyisoprene, and/or butadiene or isoprene copolymers. In the case of the graft copolymer, the alkyl acrylate resin comprises greater than 50 weight percent of the graft copolymers.

D. Polyurethanes

These thermoplastic polyurethanes may be synthesized by methods disclosed in U.S. Pat. No. 3,214,411 incorporated herein by reference. A particularly useful polyester resin used as a starting material for the thermoplastic polyurethane are those produced from adipic acid and a glycol having at least one primary hydroxyl group. The adipic acid is condensed with a suitable glycol or mixture of glycols which have at least one primary hydroxyl group. The condensation is stopped when an acid number of from about 0.5 to about 2.0 is reached. The water formed during the reaction is removed simultaneously therewith or subsequently thereto such that the final water content is from about 0.01 to about 0.2%, preferably from about 0.01 to 0.05%.

Any suitable glycol may be used in reaction with the adipic acid such, as, for example, ethylene glycol, propylene glycol, butylene glycol, hexanediol, bis- (hydroxymethylcyclohexane), 1,4-butanediol, diethylene glycol, 2,2-dimethyl propylene glycol, 1,3-propylene glycol and the like. In addition to the glycols, a small amount of trihydric alcohol of up to about 1% may be used along with the glycols such as, for example, trimethylolpropane, glycerol, hexanetriol and the like. The resulting hydroxyl polyester has a molecular weight of at least about 600, a hydroxyl number of about 25 to about 190 and preferably between about 40 and about 60, and acid number of between about 0.5 and about 2 and a water content of 0.01 to about 0.2%.

The organic diisocyanate to be used in the preparation of the elastomer is preferably 4,4'-diphenylmethane diisocyanate. It is desired that the 4,4'-diphenylmethane diisocyanate contain less than 5% of 2,4'-diphenylmethane diisocyanate and less than 2% of the dimer of diphenylmethane diisocyanate. It is further desired that the acidity calculated as HCl is from about 0.0001 to about 0.02%. The acidity calculated as percent HCl is determined by extracting the chloride from the isocyanate in a hot aqueous methanol solution or by liberating the chloride on hydrolysis with water and titrating the extract with a standard silver nitrate solution to obtain the chloride ion concentration present.

Other diisocyanates may be used in preparing the thermoplastic processable polyurethanes such as ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulfone-4,4'-diisocyanate, dichlorohexamethylene diisocyanate, pentamethylene diisocyanate, hexamethylene diisocyanate, 1-chlorobenzene-2,4-diisocyanate, furfurylidene diisocyanate and the like.

Any suitable chain extending agent having active hydrogen containing groups reactive with isocyanate groups may be used such as, for example, diols including ethylene glycol, propylene glycol, 1,4-butanediol, butenediol, butynediol, xylylene glycols, amylene glycols, 1,4-phenylene-bis-β-hydroxy ethyl ether, 1,3-phenylene-bis-β-hydroxy ethyl ether, bis-(hydroxy-methylcyclohexane), hexanediol, thiodiglycol and the like; diamines including ethylene diamine, propylene diamine, butylene diamine, hexamethylene diamine, cyclohexylene diamine, phenylene diamine, tolylene diamine, xylylene diamine, 3,3'-dichlorobenzidine, 3,3'-dinitrobenzidine and the like; alkanol amines such as, for example, ethanol amine, aminopropyl alcohol, 2,2-dimethyl propanol amine, 3-aminocyclohexyl alcohol, p-aminobenzyl alcohol and the like. The difunctional chain extenders mentioned in U.S. Pat. Nos. 2,620,516, 2,621,166 and 2,729,618 incorporated herein by reference may be used. If desirable, a small amount of polyfunctional material may be utilized. This polyfunctional chain extender, however, should not be present in an amount greater than about 1% by weight. Any suitable polyfunctional compound may be used in this application such as, for example, glycerol, trimethylolpropane, hexanetriol, pentaerythritol and the like.

In accordance with the process of this invention, the polyester, the organic diisocyanate and the chain extender may be individually heated preferably to a temperature of from about 60° to about 135° C. and then the polyester and chain extender are substantially simultaneously mixed with the diisocyanate. Of course, to increase the rate of reaction, any suitable catalyst may be added to the reaction mixture such as tertiary amines and the like as set forth in U.S. Pat. Nos. 2,620,516, 2,621,166 and 2,729,618. Although adipate polyesters are preferred, polyesters may be used which are based on succinic acid, suberic acid, sebacic acid, oxalic acid, methyl adipic acid, glutaric acid, pimelic acid, azelaic acid, phthalic acid, terephthalic acid, isophthalic acid and the like. Polyesters based on ε-caprolactone are also preferred.

A polyether may be used instead of the polyester in the preparation of the thermoplastic polyurethane and preferably polytetramethylene glycol having an average molecular weight between about 600 and 2000 and preferably about 1000. Other polyethers such as polypropylene glycol, polyethylene glycol and the like may be used providing their molecular weight is above about 600. The above and other thermoplastic polyurethanes such as disclosed in U.S. Pat. Nos. 2,621,166, 2,729,618, 3,214,411, 2,778,810, 3,012,992 Canadian Pat. Nos. 754,233, 733,577 and 842,325 all incorporated herein by reference may be used to produce the thermoplastic polyurethanes.

E. Vinyl Chloride Polymers

Vinyl chloride polymers for the purpose of this invention are polyvinyl chloride and copolymers of vinyl chloride with olefinically unsaturated polymerisable compounds which contain at least 80 percent by weight of vinyl chloride incorporated therein. Olefinically unsaturated compounds which are suitable for copolymerisation are, for example, vinylidene halides such as vinylidene chloride and vinylidene fluoride, vinyl esters such as vinyl acetate, vinyl propionate, vinyl butyrate, vinyl chloroacetate, vinyl benzoate, acrylic and α-alkyl-acrylic acids and their alkyl esters, amides and nitriles, methacrylic acid, methyl methacrylate, ethyl acrylate, 2-ethyl-hexylacrylate, butyl methacrylate, acrylamide, N-methyl acrylamide, acrylonitrile and methacrylonitrile, aromatic vinyl compounds such as styrene and vinyl naphthalene and olefinically unsaturated hydrocarbons such as ethylene, bicyclo-[2,2,1]-hept-2-ene and bicyclo-[2,2,1]-hepta-2,5-dienes. These vinyl chloride polymers are known and can be prepared by the usual methods of emulsion, suspension, bulk or mass polymerisation. Vinyl chloride polymers which have molecular weights of 40,000 to 60,000 are preferred.

F. Poly(aryl ether)s

The poly(aryl ether) resin component of the blend of this invention may be described as a linear, thermoplastic polyarylene polyether polysulfone, wherein the arylene units are interspersed with ether and sulfone linkages. These resins may be obtained by reaction of an alkali metal double salt of a dihydric phenol and a dihalobenzenoid compound, either or both of which contain a sulfone linkage —SO₂— between arylene groupings, to provide sulfone units in the polymer chain in addition to arylene units and ether units. The polysulfone polymer has a basic structure composed of recurring units of the formula

O—E—O—E'— wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such polysulfones are included within the class of polyarylene polyether resins described in U.S. Pat. No. 3,264,536, the disclosure of which is hereby incorporated herein by reference, for the purpose of describing and exemplifying E and E' in more detail, including the preferred forms of E derived from dinuclear phenols having the structure:

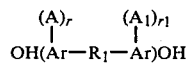

Ar is an aromatic group and preferably is a phenylene group. A and A₁ can be the same or different inert substituent groups as alkyl groups having from 1 to 4 carbon atoms, halogen atoms, i.e., fluorine, chloride, bromine or iodine, or alkoxy radicals having from 1 to 4 carbon atoms, r and r₁ are integers having a value of from 0 to 4, inclusive, and R₁ is representative of a bond between aromatic carbon atoms as in dihydroxydiphenyl, or is a divalent radical, including, for example, CO, O, S, S—S, SO₂ and divalent organic hydrocarbon radicals such as alkylene, alkylidene, cycloalkylene, or the halogen, alkyl, aryl or like substituted alkylene, alkylidene and cycloalkylene radicals as well as alkarylene and aromatic radicals and a ring fused to both Ar groups. Typical preferred polyners are composed of recurring units having the formula:

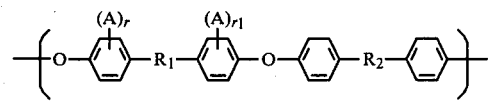

as described in the Robinson et al. patent. In the foregoing formula A and A₁ can be the same or different inert substituent groups as alkyl groups having from 1 to 4 carbon atoms, halogen atoms (e.g., fluorine, chlorine, bromine or iodine) or alkoxy radicals having from 1 to 4 carbon atoms, r and r₁ are integers having a value of from 0 to 4, inclusive. Typically, R₁ is representative of a bond between aromatic carbon atoms or a divalent connecting radical and R₂ represents sulfone, carbonyl, sulfoxide. Preferably, R₁ represents a bond between aromatic carbon atoms. Even more preferred are the thermoplastic polyarylene polysulfones of the above formula wherein r and r₁ are zero. R₁ is a divalent connecting radical of the formula

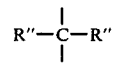

wherein R" represents, as exemplified in Robinson et al., a member of the group consisting of alkyl, lower aryl, and the halogen substituted groups thereof, and R₂ is a sulfone group.

Typical examples are the reaction products prepared from 2,2-bis-(4-hydroxyphenyl) propane (source of E residue) with 4,4'-dichlorodiphenylsulfone (source of E' residue) and equivalent reaction products such as those from 4,4'-dichlorodiphenylsulfone with bisphenol of benzophenone (4,4'-dihydroxydiphenyl ketone), or the bisphenol of acetophenone [1,1-bis(4-hydroxyphenyl) ethane], or the bisphenol of vinyl cyclohexane [1-ethyl-1-(4-hydroxyphenyl)-3-(4-hydroxyphenylcyclohexane)], or 4,4'-dihydroxydiphenyl sulfone or alpha, alpha'-bis(4-hydroxyphenyl)-p-diisopropylbenzene.

Further useful discussion of the polysulfone resins which may be used is to be found in British Pat. No. 1,060,546.

G. Copolyetherester Block Copolymer

The polyetheresters consist essentially of a multiplicity of recurring intralinear long chain and short chain ester units connected head-to-tail through ester linkages, said long chain ester units being represented by the following structure:

(a)

and said short chain ester units being represented by the following structure

(b)

wherein:

G is a divalent radical remaining after removal of terminal hydroxy groups from a poly(alkylene oxide) glycol having a molecular weight of about 400–3500; D is a divalent radical remaining after removal of hydroxyl groups from a low molecular weight diol having a molecular weight less than about 250; and $R_2$ is a divalent radical remaining after removal of carboxyl groups from a dicarboxylic acid having a molecular weight less than about 300; with the provisos that the short chain ester units constitute about 25–65% by weight of the copolyester, at least about 70% of the $R_2$ groups must be 1,4-phenylene radicals, at least about 70% of the D groups must be the 1,4-butylene radicals, and the sum of the percentages of the $R_2$ groups which are not 1,4-phenylene radicals and of the D groups which are not 1,4-butylene radicals cannot exceed about 30%.

The term "long chain ester units" as applied to units in a polymer chain refers to the reaction product of a long chain glycol with a dicarboxylic acid. Such "long chain ester units", which are a repeating unit in the copolyesters of this invention correspond to the Formula a above. The long chain glycols of the instant invention are poly(alkylene oxide) glycols having a molecular weight between about 400 and 3500, preferably between about 600 and 2000. Copolyesters prepared from poly(alkylene oxide) glycols having a molecular weight of about 600–2000 are preferred because they exhibit useful properties over a wide range of temperature, combined with limited water swell. Copolyesters prepared from poly(alkylene oxide) glycols having a molecular weight in excess of about 3500 may crystallize and lose their elastomeric character and good low temperature properties. Copolyester prepared from glycols having molecular weights below about 400 have useful properties only within a narrow temperature range and are less suited for injection molding and extrusion because of a slower rate of crystallization of the resultant block copolymer. The long chain glycols contain a major proportion of tetramethylene oxide units. In a preferred embodiment of the instant invention the long chain glycols will be entirely poly(tetramethylene oxide) glycol. In some instances it may be desirable to use random or block copolymers of tetramethylene oxide containing minor proportions of a second alkylene oxide. Typically the second monomer will constitute less than about 40 mole percent of the poly(alkylene oxide) glycols and preferably less than 20 mole percent. Representative examples of the second monomer include 1,2- and 1,3-propylene oxides, 1,2-butylene oxide and ethylene oxide.

The term "short chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by Formula (b) above.

Included among the low molecular weight diols (other than 1,4-butanediol) which react to form short chain ester units are acyclic, alicyclic and aromatic dihydroxy compounds. Preferred are diols with 2–15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bisphenols which can be used are bis(p-hydroxy) diphenyl, bis(p-hydroxyphenyl) methane, and bis(p-hydroxyphenyl) propane. Equivalent esterforming derivatives of diols are also useful (e.g., ethylene oxide or ethylene carbonate can be used in place of ethylene glycol). The term "low molecular weight diols" as used herein should be construed to include such equivalent ester-forming derivatives: provided, however, that the molecular weight requirement pertains to the diol only and not to its derivatives.

Dicarboxylic acids (other than terephthalic acid) which are reacted with the foregoing long chain glycols or low molecular weight diols to produce the copolyesters of this invention are aliphatic, cycloaliphatic or aromatic dicarboxylic acids of a low molecular weight. The term "dicarboxylic acids" as used herein, includes acid equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer in the elastomeric compositions of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often can not be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals such as —O— or —SO$_2$—, alkylene, alkylidene, etc.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexane-1,2-dicarboxylic acid, 2-ethylsuberic acid, 2,2,3,3-tetramethylsuccinic acid, cyclopentanedicarboxylic acid, decahydro-1,5-naphthylene dicarboxylic acid, 4,4-bicyclohexyl dicarboxylic acid, decahydro-2,6-naphthylene dicarboxylic acid, 4,4-methylenebis-(cyclohexyl) carboxylic acid, 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include phthalic, terephthalic and isophthalic acids, substituted dicarboxy compounds with two benzene nuclei such as bis(p-carboxyphenyl) methane, p-carboxyphenyl/oxybenzoic acid, ethylene-bis (p-oxybenzoic acid) 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid and $C_1$-$C_{12}$ alkyl and ring substituted derivatives thereof, such as halo, alkoxy, and aryl derivatives. Hydroxy acids such as p($\beta$-hydroxyethoxy) benzoic acid can also be used providing an aromatic dicarboxylic acid is also present.

Aromatic dicarboxylic acids are a preferred class for preparing the copolyester polymers useful for compositions of this invention. Among the aromatic acids, those with 8–16 carbon atoms are preferred, particularly the phenylene dicarboxylic acids, i.e., terephthalic and isophthalic acids.

It is essential that at least about 70 mole percent of the dicarboxylic acid incorporated into the polymer be terephthalic acid and at least about 70 mole percent of the low molecular weight diol incorporated into the polymer be 1,4-butanediol. Thus, at least 70% of the $R_2$ groups in Formulae a and b above are 1,4-phenylene radicals and at least about 70% of the D groups in Formula b above are 1,4-butylene radicals. A further requirement in making the polymers of this invention is that the sum of the percentages of the $R_2$ groups which are not 1,4-phenylene radicals and of the D groups which are not 1,4-butylene radicals cannot exceed about 30%. For example, if 30% of the low molecular weight diol molecules incorporated into the polymer are other than 1,4-butanediol, then all of the dicarboxylic acid used must be terephthalic acid, or if 10% of the low molecular weight diol molecules are other than 1,4-butanediol, then at least about 80% of the dicarboxylic acid used must be terephthalic acid. The D and R units which are not 1,4-butylene and 1,4-phenylene, respectively, can be derived from any of the low molecular weight diols or dicarboxylic acids named above.

The dicarboxylic acids or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, and relative reactivities. The total amount of glycol incorporated is still the difference between moles of diacid and polymeric glycol.

The copolyesters of this invention contain about 25–65% by weight of short chain ester units corresponding to Formula (b) above, the remainder being long chain ester units corresponding to Formula a above. When the copolyesters contain less than about 25% by weight short chain units, the tear strength and solvent resistance of the copolyesters fall to undesirably low levels and when the copolyesters contain more than about 65% short chain units, the low temperature properties worsen and the copolyesters become less elastomeric. The preferred balance of properties is obtained when the short chain ester content is about 55–62%.

The most preferred copolyesters of this invention are those prepared from dimethylterephthalate, 1,4-butanediol and poly (tetramethylene oxide) glycol having a molecular weight from about 600–1500.

The polymers described herein can be made conveniently by a conventional ester interchange reaction. A preferred procedure involves heating the dimethyl ester of terephthalic acid with a long chain glycol and a molar excess of a butanediol in the presence of a catalyst at 150° to 260° C. followed by distilling off methanol formed by the interchange. Heating is continued until methanol evolution is complete. Depending on temperature, catalyst and glycol excess, this polymerization is complete within a few minutes to a few hours. The procedure results in the preparation of a low molecular weight prepolymer which can be carried to a high molecular weight copolyester of this invention by the procedure described below. Such prepolymers can also be prepared by a number of alternate esterification or ester interchange processes; for example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long chain glycol.

The resulting prepolymer is then carried to high molecular weight by distillation of the excess of short chain diol. This process is known as "polycondensation". Additional ester interchange occurs during the distillation to increase the molecular weight and to randomize the arrangement of the copolyester units. Best results are usually obtained if this final distillation or polycondensation is run at less than 1 mm. Hg pressure and 240°-260° C. for less than 2 hours in the presence of antioxidants such as sym-di-beta-naphthyl-phenylenediamine and 1,3,5-trimethyl-2,4,6-tris[3,5-ditertiary butyl-4-hydroxybenzyl]benzene. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wider variety of catalysts can be used, organic titanates such as tetrabutyl titanate used alone or in combination with magnesium or calcium acetates are preferred. Complex titanates, such as

derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

These polyetheresters are described in, for example, U.S. Pat. Nos. 3,784,520 and 3,766,146.

H. Polyhydroxyether

The thermoplastic polyhydroxyethers in the present invention have the general formula

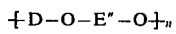

wherein D is the radical residuum of a dihydric phenol, E" is a radical residuum of an epoxide selected from mono- and diepoxides and contains from 1 to 2 hydroxyl groups and n is an integer which represents the degree of polymerization and is at least 30 and preferably is above about 80.

In general, thermoplastic polyhydroxyethers are prepared by contacting under polymerization conditions a dihydric phenol and an epoxide containing from 1 to 2 epoxide groups in substantially equimolar amounts.

The product produced by the reaction between bisphenol-A and epichlorohydrin has the repeating unit

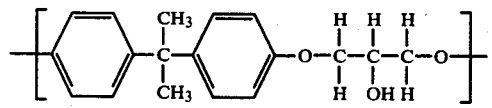

and can be termed a poly(monohydroxyether) of bisphenol-A.

The product produced by the reaction between hydroquinone and butadiene dioxide has the repeating unit

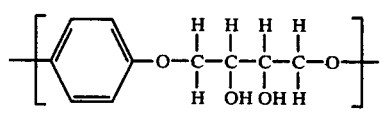

and can be termed a poly(dihydroxyether) of hydroquinone.

By the use of both a monoepoxide and a diepoxide poly(hydroxy-dihydroxyethers) can be obtained, the relative amounts of mono- and diepoxide determining the final concentration of the mono- and dihydroxy containing repeating units E" in the polymer.

Any dihydric phenol can be used in forming polyhydroxyethers. Illustrative dihydric phenols are mononuclear dihydric phenols such as hydroquinone, resorcinol, and the like as well as the polynuclear phenols which are preferred. The dihydric polynuclear phenols have the general formula:

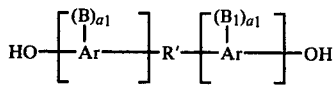

wherein: Ar is an aromatic divalent hydrocarbon radical such as naphthylene and phenylene with phenylene being preferred for the thermoplastic polyhydroxyethers used in this invention; B and $B_1$ which can be the same or different are alkyl radicals such as methyl, n-propyl, n-butyl, n-hexyl, n-octyl and the like, preferably alkyl radicals having a maximum of 4 carbon atoms; or halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having a maximum of 4 carbon atoms, a and $a_1$ are independently integers of 0 to 4, R' is alkylene, alkylidene, cycloalkylene or a saturated divalent group. Particularly preferred are dihydric polynuclear phenols having the general formula:

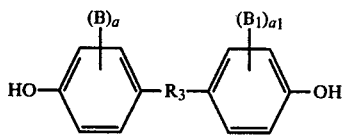

wherein B, $B_1$, a and $a_1$ are as previously defined, and $R_3$ is an alkylene or alkylidene group, preferably having from 1 to 3 carbon atoms inclusive or cycloalkylene or $R_3$ is a saturated divalent group such as is obtained from compounds such as vinylcyclohexane and dipentene or its isomers by reaction with two moles of phenol per mole of the compound. $R_3$ preferably contains from 1 to 9 carbon atoms.

Diepoxides useful for the preparation of polyhydroxyethers can be represented by the formula

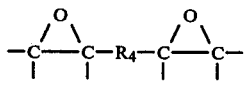

wherein $R_4$ is representative of a bond between adjacent carbon atoms or a divalent inorganic or organic radical such as an aliphatic, aromatic, homocyclic, heterocyclic or acyclic arrangement of atoms.

By the term "diepoxide" is meant a compound containing two epoxide groups i.e. groups containing an oxirane oxygen atom bonded to two vicinal aliphatic carbon atoms. Saturated diepoxides in which both the oxirane oxygen atoms are bonded to carbon atoms of a saturated aliphatic hydrocarbon chain are particularly preferred. The term "saturated diepoxides" refers to diepoxides which are free of ethylenic unsaturation, i.e. —C=C— and acetylenic unsaturation, i.e. —C≡C—. Diepoxides which contain solely carbon, hydrogen and oxygen atoms are especially preferred. The oxygen atoms can be (in addition to oxirane oxygen), ether oxygen, i.e. —O— oxacarbonyl oxygen, i.e.

carbonyl oxygen, i.e.

and the like. A single diepoxide or a mixture of at least two diepoxides can be employed in preparing the polydihydroxyethers of the present invention and the term "diepoxide" is intended to include a mixture of at least two diepoxides.

Other diepoxides which can be mentioned include those wherein the two oxirane groups are linked through an aromatic ether i.e. compounds having the grouping

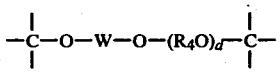

wherein $R_4$ is a divalent organic radical, W is a divalent aromatic radical residuum of a dihydric phenol such as those listed above in the description of dihydric phenols, and d is an integer from 0 to 1 inclusive.

Still other diepoxides include ethers wherein the oxirane groups are connected to vicinal carbon atoms at least one pair of which is a part of a cycloaliphatic hydrocarbon.

These polyhydroxy ethers are prepared by methods well known in the art such as those detailed in, for example, U.S. Pat. Nos. 3,238,087; 3,305,528; 3,294,747 and 3,277,051.

Ordinarily from 0.985 to 1.015 moles and preferably one mole of the epoxide is employed per mole of dihydric phenol. Polymerization occurs at room temperature (25° C.) and lower but only slowly, hence ordinarily, an elevated temperature e.g. 40° C. to 250° C. or more preferably from 80° to 125° C. is used to ensure a rapid rate of polymerization. Pressure is not at all critical, with polymerization being successfully effected at atmospheric, subatmospheric, or superatmospheric pressure with or without an inert gas such as nitrogen in the reaction vessel.

The polyarylate is used in amounts of from about 4 to about 80, preferably from about 40 to about 60 weight percent. The polyester is used in amounts of from about 4 to about 60, preferably from about 10 to about 45 weight percent. The thermoplastic polymer is used in amounts of from about 10 to about 92, preferably from about 30 to 60 weight percent.

The compositions of this invention are prepared by any conventional mixing methods. For example, a preferred method comprises mixing the polyarylate, polyester, and thermoplastic polymer in powder or granular form in an extruder and extruding the mixture into strands, chopping the strands into pellets and molding the pellets into the desired article.

It should, of course, be obvious to those skilled in the art that other additives may be included in the present compositions. These additives include plasticizers; pigments; flame retardant additives, particularly, decabromodiphenyl ether and triarylphosphates, such as triphenylphosphate; reinforcing agents, such as glass fibers; thermal stabilizers; ultraviolet light stabilizers processing aids, impact modifiers and the like. The impact modifiers which can be used are described in U.S. Patent application Ser. No. 049,131 of L. M. Robeson, titled "Impact Modified Polyarylate Blends", filed June 18, 1979. These impact modifiers are a graft copolymer of a vinyl aromatic, an acrylate, an unsaturated nitrile, or mixtures thereof, grafted onto an unsaturated elastomeric backbone and having a tensile modulus (as measured by ASTM D-638, except that the test piece is compression molded to a 20 mil thickness) of less than about 100,000 psi, and preferably from about 15,000 to less than about 100,000 psi.

The unsaturated elastomeric backbone may be polybutadiene, poly(butadiene-co-styrene), poly(butadiene-co-acrylonitrile), or poly(isoprene). In each of the polymers there is sufficient butadiene to give the polymer a rubbery character.

The constituents which are grafted onto the unsaturated elastomeric backbone are selected from a vinyl aromatic, such as styrene, α-methylstyrene, alkylstyrene, or mixtures thereof; an acrylate such as the acrylic ester monomers, such as methyl acrylate, ethyl acrylate, butyl acrylate, methyl methacrylate, or mixtures thereof; an unsaturated nitrile such as acrylonitrile, methacrylonitrile, or mixtures thereof. It will be understood that the vinyl aromatic, acrylate and acrylonitrile may be used individually or in any combinations in grafting onto the unsaturated elastomeric backbone.

These impact modifiers are free-flowing powders and are commercially available as impact modifiers for poly(vinyl chloride) as described in, for example, V. Shakaypal, in "Developments in PVC Technology", edited by J. H. L. Hensen and A. Whelan, Applied Science Publishers Ltd., New York, 1973.

The grafted constituents of the impact modifier will comprise from about 20 to about 60 percent by weight of said constituents such that their tensile modulus does not exceed about 100,000 psi, and is preferably, between about 15,000 to less than about 100,000 psi.

EXAMPLES

The following examples serve to give specific illustrations of the practice of this invention but they are not intended in any way to limit the scope of this invention.

CONTROL A 60 weight percent of poly(ethylene terephthalate) having an intrinsic viscosity of 1.04 as measured in 60:40 phenol/tetrachloroethane mixture at 23° C. was blended with 40 weight percent of an aromatic bisphenol-A polycarbonate (Lexan 101 sold by General Electric Company) having a reduced viscosity of 0.64 as measured in chloroform at 25° C.

This blend was prepared by extrusion blending the components at about 275° C. in a single screw 1-inch diameter extruder with L/D=36/1. The extrudate was chopped into pellets. The pelletized product was then injection molded into ASTM test specimens (at 270°-300° C.) using a Newbury 1¼ ounce screw injection molding machine. The test specimens were measured for the following properties: tensile strength and modulus according to ASTM D-638; elongation at break according to ASTM D-638; notched izod impact strength according to ASTM D-256; tensile impact strength according to ASTM D-1822; heat distortion temperature measured at 264 psi on a ⅛ inch thick unannealed test bar according to ASTM D-635. Also, the clarity of the test specimen as molded was observed.

The results are shown in Table I.

EXAMPLE 1

80 weight percent of the poly(ethylene terephthalate) described in Control A was blended with 10 weight percent of the polycarbonate described in Control A and 10 weight percent of polyarylate (Ardel D-100, sold by Union Carbide Corporation and prepared from, Bisphenol-A and a mixture of 50 mole percent each of terephthalic and isophthalic acid chlorides, by conventional methods) having a reduced viscosity of 0.66 as measured in p-chlorophenol at 49° C. (0.2 g/100 ml.).

The blend was prepared in an extruder by the procedure as described in Control A. The extrudate was chopped into pellets, molded into test bars and tested by the procedures as described in Control A.

EXAMPLE 2

60 weight percent of the poly(ethylene terephthalate) described in Control A was blended with 20 weight percent of the polycarbonate described in Control A and 20 weight percent of the polyarylate described in Example 1.

The blend was prepared in an extruder by the procedure as described in Control A. The extrudate was chopped into pellets, molded into test bars and tested by the procedures as described in Control A.

The results are shown in Table I.

EXAMPLE 3

40 weight percent of the poly(ethylene terephthalate) described in Control A was blended with 30 weight percent of the polycarbonate described in Control A and 30 weight percent of the polyarylate described in Example 1.

The blend was prepared in an extruder by the procedure as described in Control A. The extrudate was chopped into pellets, molded into test bars and tested by the procedures as described in Control A.

The results are shown in Table I.

CONTROL B

The procedure of Control A was exactly repeated except that the blend was prepared by extrusion blending the components at about 310° C. instead of about 275° C.

The results are shown in Table I.

EXAMPLE 4

The procedure of Example 1 was exactly repeated except that the blend was prepared by extrusion blending the components at about 310° C. instead of about 275° C.

The results are shown in Table I.

EXAMPLE 5

The procedure of Example 2 was exactly repeated except that the blend was prepared by extrusion blending the components at about 310° C. instead of about 275° C.

The results are shown in Table I.

EXAMPLE 6

The procedure of Example 3 was exactly repeated except that the blend was prepared by extrusion blending the components at about 310° C. instead of about 275° C.

The results are shown in Table I.

The data of Table I show that a ternary blend of a polyarylate, a polyester and a polycarbonate, according to the present invention, has excellent mechanical properties. Additionally, two component mixtures are rarely transparent and transparency in three component systems is unique. Example 5 shows that the addition of polyarylate to a polycarbonate/poly(ethyleneterephthalate) blend (control B) improves the transparency.

TABLE I

| Example | Description of the Composition[1] Polymer | (wt.%) | Clarity After Molding at 275° C. | Clarity After Molding at 310° C. | Tensile Modulus (psi) | Tensile Strength (psi) | Elongaton (percent) | Notched Izod Impact Strength ft.-lbs./ in. of Notch | Tensile Impact Strength (ft.-lbs./in.$^2$) | Heat Distortion Temp. (°C.) |
|---|---|---|---|---|---|---|---|---|---|---|
| Control A | PE | 60 | opaque | — | 358,000 | 8,850 | 150 | 1.09 | 187 | 76 |
|  | PC | 40 |  |  |  |  |  |  |  |  |
| 1 | PE | 80 | transparent | — | 366,000 | 8,410 | 98 | 0.93 | 149 | 73 |
|  | PC | 10 |  |  |  |  |  |  |  |  |
|  | PA | 10 |  |  |  |  |  |  |  |  |
| 2 | PE | 60 | opaque | — | 366,000 | 8,700 | 90 | 1.26 | 160 | 76 |
|  | PC | 20 |  |  |  |  |  |  |  |  |
|  | PA | 20 |  |  |  |  |  |  |  |  |
| 3 | PE | 40 | transparent | — | 370,000 | 9,450 | 48 | 1.19 | 114 | 94 |
|  | PC | 30 |  |  |  |  |  |  |  |  |
|  | PA | 30 |  |  |  |  |  |  |  |  |
| Control B | PE | 60 | — | opaque | 363,000 | 9,120 | 198 | 1.09 | 179 | 78 |
|  | PC | 40 |  |  |  |  |  |  |  |  |
| 4 | PE | 80 | — | transparent | 351,000 | 8,430 | 133 | 0.80 | 136 | 71 |
|  | PC | 10 |  |  |  |  |  |  |  |  |
|  | PA | 10 |  |  |  |  |  |  |  |  |
| 5 | PE | 60 | — | transparent | 362,000 | 9,020 | 162 | 0.78 | 148 | 82 |
|  | PC | 20 |  |  |  |  |  |  |  |  |
|  | PA | 20 |  |  |  |  |  |  |  |  |
| 6 | PE | 40 | — | transparent | 366,000 | 9,490 | 87 | 1.04 | — | 97 |
|  | PC | 30 |  |  |  |  |  |  |  |  |
|  | PA | 30 |  |  |  |  |  |  |  |  |

PE = poly(ethylene terephthalate)
PC = polycarbonate
PA = polyarylate

CONTROL C

The polyarylate (Ardel D-100) described in Example 1 was injection molded into ASTM test specimens (at 270°–300° C.) using a Newbury 1¼ ounce screw injection molding machine. The test specimens were measured for the following properties: tensile strength and modulus according to ASTM D-638; elongation at break according to ASTM D-638; notched izod impact strength according to ASTM D-256; tensile impact strength according to ASTM D-1822; heat distortion temperature measured at 264 psi on a ⅛ inch thick unannealed test bar according to ASTM D-635. Also, the minimum melt temperature required for injection molding, was determined using a 3 ounce Van Dorn injection molding machine with a four cavity ASTM test specimen mold. The minimum melt temperature is the lowest polymer melt temperature, determined by a pyrometer, to fill the four cavity mold.

The results are shown in Table 2.

CONTROL D

The polycarbonate (Lexan 101) described in Control A was injection molded into test bars and tested by the procedure as described in Control C.

The results are shown in Table 2.

CONTROL E 67 weight percent of the polyarylate (Ardel D-100) described in Control C was blended with 33 weight percent of a copolyester, PETG-6763, (a copolyester prepared by the reaction of cyclohexanedimethanol and ethylene glycol with terephthalic acid, in a molar ratio of 1:2:3. This polyester has a $M_n$ of about 26,000 and is sold by Tennessee Eastman Company).

This blend was prepared by extrusion blending the components at about 270° C. in a single screw 1-inch diameter extruder with L/D=36/1. The extrudate was chopped into pellets. The pelletized product was then injection molded into ASTM test specimens and tested by the procedure as described in Control C.

The results are shown in Table 2.

CONTROL F 50 weight percent of the polyarylate (Ardel D-100) described in Control C was blended with 50 weight percent of the polycarbonate (Lexan 101) described in Control A. The blend was prepared by extrusion blending the components by the procedure described in Control E. The pelletized product was injection molded into ASTM test specimens and tested by the procedure as described in Control C.

The results are shown in Table 2.

EXAMPLE 7

33.3 weight percent of the polyarylate (Ardel D-100) described in Control C was blended with 16.7 weight percent of a copolyester, PETG-6763, described in Control E and 50 weight percent of the polycarbonate (Lexan 101) described in Control A. The blend was prepared by extrusion blending the components by the procedure described in Control E. The pelletized product was injection molded into ASTM test specimens and tested by the procedures as described in Control C.

The results are shown in Table 2.

The data of Table 2 shows that the addition of a copolyester to blends of polyarylate and polycarbonate results in excellent compatability with the polyarylate and a polycarbonate. Also, the addition of a copolyester to a blend of a polyarylate and a polycarbonate improves the processability as shown by the minimum melt temperature required for injection molding.

TABLE 2

| Example | Description of the Composition[1] Polymer | (wt.%) | Tensile Modulus (psi) | Tensile Strength (psi) | Elongation (percent) | Notched Izod Impact Strength (ft.-lbs./in. of Notch) | Tensile Impact Strength (ft.-lbs./in.$^2$) | Heat Distortion Temp. (°C.) | Minimum Injection Molding Temp. (°F.) |
|---|---|---|---|---|---|---|---|---|---|
| Control C | PA | 100 | 280,000 | 9,500 | 48 | 4.2 | 132 | 174 | |
| Control D | PC | 100 | 325,000 | 9,000 | 50–100 | 18 | — | 128 | |
| Control E | PA | 67 | 330,000 | 9,800 | 74 | 2.3 | 166 | 118 | |
| | PETG | 33 | | | | | | | |
| Control F | PA | 50 | 320,000 | 10,000 | 80 | 8.8 | 170 | 147 | 630° F. |
| | PC | 50 | | | | | | | |
| 7 | PA | 33.3 | 330,000 | 9,600 | 80 | 6.8 | 150 | 128 | 560° F. |
| | PETG | 16.7 | | | | | | | |
| | PC | 50 | | | | | | | |

[1]PA = polyarylate
PC = polycarbonate
PETG = copolyester, PETG 6763

CONTROL G

A polyarylate (prepared from Bisphenol-A and a mixture of 25 mole percent terephthalic acid chloride and 75 mole percent isophthalic acid chloride, by conventional methods, having a reduced viscosity of 0.77 as measured in p-chlorophenol at 49° C., 0.2 g/100 ml.) was injection molded into ASTM test specimens (at 270°–300° C.) using a Newbury 1¼ ounce screw injection molding machine. The test specimens were measured for the following properties: tensile strength and modulus according to ASTM D-638; elongation at break according to ASTM D-638; and notched izod impact strength according to ASTM D-256.

The results are shown in Table 3.

CONTROL H

A styrene/acrylonitrile grafted onto a butylacrylate based elastomeric backbone, an ABS type resin, (Luran S described in Table 3 and sold by BASF) was molded into test specimens and tested by the procedures as described in Control G.

The results are shown in Table 3.

CONTROL I

A poly(butylene terephthalate) resin (6PRO sold by Tennessee Eastman Co.) having an R.V. of 1.83 as measured in 60/40 phenol/tetrachloroethane (1 g/1000 ml)

at 25° C., was molded into test specimens and tested by the procedures as described in Control G.

The results are shown in Table 3.

CONTROL J 60 weight percent of the polyarylate described in Control G was blended with 40 weight percent of the poly butylene terephthalate) described in Control I.

This blend was prepared by extrusion blending the components at about 270° C. in a single screw 1-inch diameter extruder with L/D=36/1. The extrudate was chopped into pellets. The pelletized product was then injection molded into ASTM test specimens (at 270°-300° C.) using a Newbury 1¼ ounce screw injection molding machine. The test specimens were tested as described in Control G.

The results are shown in Table 3.

EXAMPLE 8

36 weight percent of the polyarylate described in Control G was blended with 24 weight percent of the poly(butylene terephthalate) described in Control I and 40 weight percent of the ABS resin described in Control H.

The blend was prepared by the procedure described in Control J. The pelletized product was injection molded into test specimens and tested by the procedures described in Control G.

The results are shown in Table 3.

The data of Table 3 shows that the ternary blend of this invention exhibits a notched izod impact strength higher than the individual components.

man Co. under the designation 7-DRO, the terephthalate to isophthalate ratio is 1:1).

This blend was prepared by extrusion blending the components at about 270° C. in a single screw 1-inch diameter extruder with L/D=36/1. The extrudate was chopped into pellets. The pelletized product was then injection molded into ASTM test specimens (at 270°-300° C.) using a Newbury 1¼ ounce screw injection molding machine. The test specimens were measured for the following properties: tensile strength and modulus according to ASTM D-638; elongation at break according to ASTM D-638; flexural strength and modulus according to ASTM D-790; notched izod impact strength according to ASTM D-256; tensile impact strength according to ASTM D-1822; heat distortion temperature measured at 264 psi on a ⅛ inch thick unannealed test bar according to ASTM D-635.

The results are shown in Table 4.

EXAMPLE 9

40 weight percent of the polyarylate (Ardel D-100) described in Example 1 was blended with 20 weight percent of the copolyester (7 DRO) described in Control K and 40 weight percent of the ABS resin, Luran S, described in Control H.

The blend was prepared by extrusion blending the components as described in Control K. The pelletized product was injection molded into test bars and tested by the procedures described in Control K.

The results are set forth in Table 4.

The data in Table 4 shows that the copolyester is compatible with the blend of polyarylate and ABS as

TABLE 3

| Example | Description of the Composition[1] Polymer | (wt.%) | Tensile Modulus (psi) | Tensile Strength (psi) | Elongation (percent) | Notched Izod Impact Strength (ft.-lbs./in. of Notch) |
|---|---|---|---|---|---|---|
| Control G | PA | 100 | 305,000 | 10,400 | 20 | 2.6 |
| Control H | ABS | 100 | 297,000 | 5,840 | 29 | 1.53 |
| Control I | PBT | 100 | 404,000 | 7,710 | 295 | 1.1 |
| Control J | PA | 60 | 335,000 | 9,430 | 138 | 0.9 |
|  | PBT | 40 |  |  |  |  |
| 8 | PA | 36 | 319,000 | 7,870 | 68 | 13.7 |
|  | PBT | 24 |  |  |  |  |
|  | ABS | 40 |  |  |  |  |

[1]PA = polyarylate
PBT = poly(butylene terephthalate)
ABS = styrene/acrylonitrile/grafted into a butyl acrylate based elastomeric backbone, Luran S.

seen by the good mechanical properties.

TABLE 4

| Example | Description of the Composition[1] Polymer | (wt.%) | Tensile Modulus (psi) | Tensile Strength (psi) | Elongation (percent) | Flexural Modulus (psi) | Flexural Strength (psi) | Notched Izod Impact Strength (ft.-lbs./in. of Notch) | Tensile Impact Strength (ft.-lbs./in.[2]) | Heat Distortion Temp. (°C.) |
|---|---|---|---|---|---|---|---|---|---|---|
| Control H | ABS | 100 | 297,000 | 5,840 | 29 | — | — | 1.53 | 218 | 76 |
| Control K | PA | 60 | 348,000 | 9,450 | 83 | 328,000 | 13,200 | 1.2 | 80 | 103 |
|  | PE | 40 |  |  |  |  |  |  |  |  |
| 9 | PA | 40 | 347,000 | 7,520 | 96 | 309,000 | 11,800 | 2.0 | 196 | — |
|  | PE | 20 |  |  |  |  |  |  |  |  |
|  | ABS | 40 |  |  |  |  |  |  |  |  |

[1]ABS = styrene/acrylonitrile resin grated onto butyl acrylate rubber.
PA = polyarylate
PE = copolyester 7DRO

CONTROL K 60 weight percent of a polyarylate, Ardel D-100, described in Example 1 was blended with 40 weight percent of poly(1,4-cyclohexanedimethanol tere/isophthalate) (commercially available from Tennessee East-

CONTROL L

A blend of α-methylstyrene/acrylonitrile copolymer and styrene/acrylonitrile grafted onto a butadiene based elastomeric backbone (Kralastic K-2938 sold by Uniroyal Company and having the mechanical properties listed in Table 5) was injection molded into ASTM test specimens (at 270°–300° C.) using a Newbury 1¼ ounce screw injection molding machine. The test specimens were measured for the following properties: tensile strength and modulus according to ASTM D-638; elongation at break according to ASTM D-638; flexural strength and modulus according to ASTM D-790; notched izod impact strength according to ASTM D-256; heat distortion temperature measured at 264 psi on a ⅛ inch thick unannealed test bar according to ASTM D-635 and tensile impact strength according to ASTM-D-1822.

The results are shown in Table 5.

CONTROL M

A styrene/acrylonitrile grafted onto a butadiene based elastomer (Kralastic MV sold by Uniroyal Company and having the mechanical properties listed in Table 5) was injection molded into test bars and tested as described in Control L.

The results are shown in Table 5.

CONTROL N

A styrene/acrylonitrile grafted onto a butadiene based elastomer (Cycolac T-100 sold by Borg Warner Company, and having the mechanical properties listed in Table 5) was injection molded into test bars and tested as described in Control L.

The results are shown in Table 5.

CONTROL O 67 weight percent of a polyarylate, Ardel D-100 described in Example 1 was blended with 33 weight percent of a copolyester, PETG-6763, described in Control E.

This blend was prepared by extrusion blending the components at about 270° C. in a single screw 1-inch diameter extruder with L/D=36/1. The extrudate was chopped into pellets. The pelletized product was then injection molded into ASTM test specimens and tested as described in Control L.

The results are shown in Table 5.

EXAMPLE 10

40 weight percent of a polyarylate, Ardel D-100, was blended with 20 weight percent of a copolyester, PETG-6763, and 40 weight percent of Kralastic 2938, described in Control L.

The blend was prepared as described in Control O. The product was injection molded into test specimens and tested as described in Control L.

The results are shown in Table 5.

EXAMPLE 11

40 weight percent of polyarylate, Ardel D-100, was blended with 20 weight percent of a copolyester, PETG-6763, and 40 weight percent of Kralastic MV, described in Control M.

The blend was prepared as described in Control O. The product was injection molded into test specimens and tested as described in Control L.

The results are shown in Table 5.

EXAMPLE 12

40 weight percent of a polyarylate, Ardel D-100, was blended with 20 weight percent of a copolyester, PETG-6763, and 40 weight percent of Cyclolac T-1000 described in Control N.

The blend was prepared as described in Control O. The product was injection molded into test specimens and tested as described in Control L.

The results are shown in Table 5.

EXAMPLE 13

40 weight percent of a polyarylate, Ardel D-100 was blended with 20 weight percent of a copolyester, PETG-6763 and 40 weight percent of Luran S described in Control H.

The blend was prepared as described in Control O. The product was injection molded into test specimens and tested as described in Control L.

The results are shown in Table 5.

The data in the Table shows that the ternary blends of polyarylate/copolyester/ABS, of the present invention, exhibit excellent compatibility as shown by the tensile strength values which are intermediate between those of the component values. Also, the addition of the polyarylate/copolyester binary blend to ABS increases the heat distortion temperature of ABS.

TABLE 5

| Example | Description of the Composition[1] Polymer | (wt.%) | Tensile Modulus (psi) | Tensile Strength (psi) | Elongation (percent) | Flexural Modulus (psi) | Flexural Strength (psi) | Notched Izod Impact Strength (ft.-lbs./ in. of Notch) | Tensile Impact Strength (ft.- lbs./in.[2]) | Heat Distortion Temp. (°C.) |
|---|---|---|---|---|---|---|---|---|---|---|
| Control L | K-2938 | 100 | 307,000 | 6,080 | 28.6 | — | — | 5.2 | 59 | 85 |
| Control M | KMV | 100 | 263,000 | 4,850 | 18 | 310,000 | 9,330 | 6.1 | — | 73 |
| Control N | T-1000 | 100 | 296,000 | 5,790 | 11.7 | 344,000 | 10,500 | 6.2 | — | 75 |
| Control O | PA | 67 | 321,000 | 9,710 | 33 | 335,000 | 15,800 | 2.5 | 133 | 113 |
|  | PE | 33 |  |  |  |  |  |  |  |  |
| 10 | PA | 40 | 378,000 | 8,320 | 13.3 | — | — | 2.1 | 92 | 93 |
|  | PE | 20 |  |  |  |  |  |  |  |  |
|  | K-2938 | 40 |  |  |  |  |  |  |  |  |
| 11 | PA | 40 | 314,000 | 7,650 | 13 | 371,000 | 13,800 | 1.5 | 89 | 91 |
|  | PE | 20 |  |  |  |  |  |  |  |  |
|  | K-MV | 40 |  |  |  |  |  |  |  |  |
| 12 | PA | 40 | 287,000 | 8,290 | 17 | — | — | 1.2 | 113 | 93 |
|  | PE | 20 |  |  |  |  |  |  |  |  |
|  | T-1000 | 40 |  |  |  |  |  |  |  |  |
| 13 | PA | 40 | 263,000 | 7,310 | 55 | — | — | 2.1 | 176 | 96 |
|  | PE | 20 |  |  |  |  |  |  |  |  |

TABLE 5-continued

| Example | Description of the Composition[1] Polymer | (wt.%) | Tensile Modulus (psi) | Tensile Strength (psi) | Elongation (percent) | Flexural Modulus (psi) | Flexural Strength (psi) | Notched Izod Impact Strength (ft.-lbs./ in. of Notch) | Tensile Impsct Strength (ft.- lbs./in.[2]) | Heat Distortion Temp. (°C.) |
|---|---|---|---|---|---|---|---|---|---|---|
| | Luran-S | 40 | | | | | | | | |

[1]K-2938 = Kralastic K-2938
PA = polyarylate
K-MV = Kralastic MV
PE = copolyester PETG-6763
T-1000 = Cycolac T-1000

CONTROL P

A styrene/acrylonitrile copolymer grafted onto a butyl acrylate rubber (Luran S 776 sold by BASF) was compression molded at 250° C. into 20 mil thick samples. These samples were exposed in an artificial weathering unit for 500, 1000, 2000, and 3000 hours, by the procedure and equipment as described in ASTM D-1499. From the exposed specimens, ⅛ inch wide specimens were shear cut to determine the tensile strength according to ASTM-D-638. The initial tensile strength of the sample after molding is shown in Table 6 and the percent of the retention of the tensile strength of the samples is reported after 500, 1000, 2000 and 3000 hours of exposure in the weathering unit (XW-Weatherometer).

The results are shown in Table 6.

EXAMPLE 14

90 weight percent of the ABS described in Control P (Luran S 776), was blended with 6 weight percent of polyarylate, Ardel D-100, and 4 weight percent of poly-(ethylene terephthalate) having an intrinsic viscosity of 0.64 as measured in 60:40 phenol/tetrachloroethane mixture at 23° C.

The blend was prepared by blending the materials in a Brabender blender at 250°-270° C. The blend was then compression molded into test samples and tested by the procedures as described in Control P.

The results are shown in Table 6.

EXAMPLE 15

80 weight percent of the ABS described in Control P (Luran S 776) was blended with 12 weight percent of polyarylate, Ardel D-100, and 8 weight percent of the poly(ethylene terephthalate) described in Example 14.

The blend was prepared by blending the materials in a Brabender blender at 250°-270° C. The blend was then compression molded into test samples and tested by the procedure as described in Control P.

The results are shown in Table 6.

The data of Table 6 show that the addition of a polyarylate/poly(ethylene terephthalate) blend to an ABS polymer improves the resistance to accelerated weathering. Even when the polyarylate is added at low levels (6% and 12%) an excellent improvement in the retention of tensile strength of the ABS after accelerated weathering is observed.

TABLE 6

| Example | Description of the Composition[1] Polymer | (wt. %) | Initial Tensile Strength (psi) | Retention of Initial Tensile Strength (%) after Exposure in Weatherometer for: 500 | 1000 | 2000 | 3000 (hrs.) |
|---|---|---|---|---|---|---|---|
| Control P | ABS | 100 | 3460 | 86 | 79 | 75 | 59 |
| 14 | ABS | 90 | 3470 | 101 | 86 | 91 | 88 |
| | PA | 6 | | | | | |
| | PET | 4 | | | | | |
| 15 | ABS | 80 | 3710 | 109 | 98 | 99 | 95 |
| | PA | 12 | | | | | |
| | PET | 8 | | | | | |

[1]ABS = Luran S 776
PA = polyarylate
PET = poly(ethylene terephthalate)

CONTROL Q

Samples of a polyarylate, Ardel D-100, were compression molded into 20 to 30 mil thick samples. Samples ⅛ inch wide and 20 to 30 mils thick were placed under the stress shown in Table 7. A cotton swab saturated with the chemical environment, as identified in Table 7, is attached to the center of the test specimen. The time for the specimen to rupture is then recorded.

The results are shown in Table 7.

CONTROL R 75 weight percent of polyarylate, Ardel D-100, was blended with 25 weight percent of poly(ethyleneterephthalate) having an intrinsic viscosity of 0.64 as measured in 60:40 phenol/tetrachloroethane mixture at 23° C.

The blend was prepared by blending the materials in a Brabender blender at 250°-270° C. The blend was compression molded and tested as described in Control Q.

The results are shown in Table 7.

EXAMPLE 16

60 weight percent of the blend of polyarylate and poly(ethylene terephthalate) of Control R was blended with 40 weight percent of an ABS resin (Kralastic K-2938 described in Control L).

The blend was prepared by blending the materials in a Brabender blender at 250°-270° C. The blend was compression molded and tested as described in Control Q.

The results are shown in Table 7.

The data in the Table show that the environmental stress crack resistance of polyarylate and a blend of polyarylate and poly(ethylene terephthalate) is quite poor in several organic environments. The addition of ABS to the polyarylate/poly(ethylene terephthalate) blend yields improved stress crack resistance.

TABLE 7

| Example | Description of the Composition[1] Polymer | wt. % | Chemical Environment | Stress (psi) | Time to Rupture (sec) |
|---|---|---|---|---|---|
| Control Q | PA | 100 | acetone | 500 | 1 |
| Control R | PA | 75 | | | |
| | PET | 25 | acetone | 500 | 1 |
| 16 | PA (75) | | | | |
| | | 60 | acetone | 500 | 108 |
| | PET (25) | | | | |
| | ABS | 40 | | | |
| Control Q | PA | 100 | methyl ethyl ketone | 500 | 2 |
| Control R | PA | 75 | | | |
| | PET | 25 | methyl ethyl ketone | 500 | 1 |
| 16 | PA (75) | | | | |
| | | 60 | methyl ethyl ketone | 500 | 234 |
| | PET (25) | | | | |
| | ABS | 40 | | | |
| Control Q | PA | 100 | carbon tetrachloride | 1000 | 15 |
| Control R | PA | 75 | | | |
| | PET | 25 | carbon tetrachloride | 1000 | 5 |
| 16 | PA (75) | | | | |
| | | 60 | carbon tetrachloride | 1000 | 153 |
| | PET (25) | | | | |
| | ABS | 40 | | | |

[1]PA = polyarylate
PET = poly(ethylene terephthalate)
ABS = K-2938

CONTROL S 60 weight percent of a polyarylate, Ardel D-100, described in Example 1, was blended with 40 weight percent of an impact modified poly(methyl methacrylate) grafted onto a butadiene based elastomeric backbone (Implex R sold by Rohm & Haas Company).

This blend was prepared by extrusion blending the components at about 270° C. in a single screw 1-inch diameter extruder with L/D=36/1. The extrudate was chopped into pellets. The pelletized product was then injection molded into ASTM test specimens (at 270°-300° C.) using a Newbury 1¼ ounce screw injection molding machine. The test specimens were measured for the following properties: tensile strength and modulus according to ASTM D-638; elongation at break according to ASTM D-638; flexural strength and modulus according to ASTM-790; notched izod impact strength according to ASTM D-256; tensile impact strength according to ASTM D-1822; heat distortion temperature measured at 264 psi on a ⅛ inch thick unannealed test bar according to ASTM D-635. Also, the surface appearance of the molded article is described.

The results are shown in Table 8.

EXAMPLE 17

40 weight percent of a polyarylate, Ardel D-100, was blended with 40 weight percent of poly(methyl methacrylate) as described in Control S and 20 weight percent of a copolyester, 7-DRO, described in Control K.

The blend was prepared, molded into test bars and tested as described in Control S.

The results are shown in Table 8.

TABLE 8

| Example Description of the Composition[1] | Control S | 17 |
|---|---|---|
| Polymer (wt.%) | PA (60) | PA (40) |

TABLE 8-continued

| Example Description of the Composition[1] | Control S | 17 |
|---|---|---|
| | PMMA (40) | PE (20) PMMA (40) |
| Tensile modulus (psi) | 306,000 | 314,000 |
| Tensile strength (psi) | 7,830 | 7,640 |
| Elongation (percent) | 34 | 76 |
| Flexural modulus (psi) | 315,000 | 317,000 |
| Flexural strength (psi) | 11,800 | 12,100 |
| Notched Izod Impact Strength (ft.-lbs./in. of notch) | 0.90 | 1.2 |
| Tensile impact strength (ft.-lbs./in.$^3$) | 62 | 102 |
| Surface appearance of injection molded bars | Rough irregular surface | Glossy, smooth surface |

[1]PA = polyarylate
PMMA = poly(methyl methacrylate)
PE = copolyester, 7-DRO

The data in the Table shows that the addition of poly(1,4-cyclohexanedimethanol tere/isophthalate) to a polyarylate/poly(methyl methacrylate) blend shows an improvement in the surface characteristics of injection molded articles and also provides improvement in mechanical properties.

CONTROL T

Poly(methyl methacrylate) grafted onto butadiene based rubber (Plexiglas DR sold by Rohm & Haas Co. and having the properties described in Table 9) was injection molded into ASTM test specimens (at 240° C.) using a Newbury 1¼ ounce screw injection molding machine. The test specimens were measured for the following properties: tensile strength and modulus according to ASTM D-638; flexural strength and modulus according to ASTM D-790; elongation at break according to ASTM D-638; notched izod impact strength according to ASTM D-256; tensile impact strength according to ASTM D-1822; heat distortion temperature measured at 264 psi on a ⅛ inch thick unannealed test bar according to ASTM D-635. The appearance of the molded surface after molding into test bars is described.

The results are shown in Table 9.

CONTROL U 67 weight percent of a polyarylate, Ardel D-100, described in Example 1 was blended with 33 weight percent of a copolyester, PETG-6763, described in Control E.

This blend was prepared by extrusion blending the components at about 270° C. in a single screw 1-inch diameter extruder with L/D=36/1. The extrudate was chopped into pellets. The pelletized product was then injection molded into ASTM test specimens and tested as described in Control T.

The results are shown in Table 9.

CONTROL V 60 weight percent of a polyarylate, Ardel D-100, was blended with 40 weight percent of a poly(methyl methacrylate) resin (Plexiglas DR) described in Control T.

The blend was prepared as described in Control U. The product was molded into test bars and tested as described in Control T.

The results are shown in Table 9.

EXAMPLE 18

40 weight percent of a polyarylate, Ardel-D-100, was blended with 20 weight percent of a copolyester, PETG-6763, and 40 weight percent of a poly(methyl methacrylate) resin (Plexiglas DR) described in Control T.

The blend was prepared as described in Control U. The product was molded into test bars and tested as described in Control T.

The results are shown in Table 9.

The data in the Table show that when a ternary blend of polyarylate, copolyester, and poly(methyl methacrylate), according to this invention, is molded it has a surface which is uniform and smooth in comparison to a blend of polyarylate and poly(methyl methacrylate) where the the resultant molded article has a surface which is irregular and rough. The ternary blend of this invention also has an acceptable combination of mechanical properties.

and modulus according to ASTM D-638, and elongation at break according to ASTM D-638.

The results are shown in Table 10.

Preparation of blend of polyarylate and poly(ethylene-terephthalate): 60 weight percent of polyarylate (Ardel D-100 sold by Union Carbide Corporation and prepared from Bisphenol-A and a mixture of 50 mole percent each of terephthalic and isophthalic acid chlorides, by conventional methods, having a reduced viscosity of 0.66 as measured in p-chlorophenol at 49° C., 0.2 g/100 ml.) was blended with 40 weight percent of poly(ethylene terephthalate) having an intrinsic visosity of 0.64 as measured in a 60/40 1,1,2,2-tetrachloroethane/phenol mixture at 25° C.

This blend was prepared by extrusion blending the components at about 270° C. in a single screw 1-inch diameter extruder with L/D=36/1.

EXAMPLE 19

20 weight percent of the blend of polyarylate and poly(ethylene terephthalate) described above was blended with 80 weight percent of the polyurethane, Pellethane 2102-80A, described in Control W.

The blend was prepared by extrusion blending the components at about 210°–220° C. in a single screw 1-inch diameter extruder with L/D=36/1. The extrudate was chopped into pellets. The pelletized product was molded into test bars and tested by the procedures as described in Control W.

The results are shown in Table 10.

EXAMPLE 20

The procedure of Example 19 was exactly repeated except that 40 weight percent of the blend of polyarylate and poly(ethylene terephthalate) and 60 weight percent of the polyurethane were used.

The results are shown in Table 10.

CONTROL X

A polyurethane (Texin 355 DXH sold by Mobay Chemical Co. and having the mechanical properties described in Table 10) was injection molded into test bars and tested by the procedures as described in Con-

TABLE 9

| Example | Description of the Composition[1] Polymer | (wt. %) | Tensile Modulus (psi) | Tensile Strength (psi) | Elongation (percent) | Flexural Modulus (psi) | Flexural Strength (psi) | Notched Izod Impact Strength (ft.-lbs./in. of Notch) | Tensile Impact Strength (ft.-lbs./in.[2]) | Heat Distortion Temp. (°C.) | Appearance of molded Surface |
|---|---|---|---|---|---|---|---|---|---|---|---|
| Control T | PMMA | 100 | 242,000 | 5,780 | 48 | 277,000 | 9,390 | 1.17 | 42 | 70 | Uniform and Smooth |
| Control U | PA PE | 67 33 | 321,000 | 9,710 | 33 | 335,000 | 15,800 | 2.5 | 133 | 113 | Uniform and Smooth |
| Control V | PA PMMA | 60 40 | 268,000 | 8,250 | 78 | — | — | 0.90 | 17 | 104 | Irregular and Rough |
| 18 | PA PE PMMA | 40 20 40 | 297,000 | 8,440 | 47 | — | — | 1.0 | 94 | 98 | Uniform and Smooth |

[1]PMMA = poly(methyl methacrylate), Plexiglas DR
PA = polyarylate
PE = copolyester, PETG-6763

CONTROL W

A polyurethane (Pellethane 2102-80A sold by Upjohn Company and having the mechanical properties described in Table 10) was injection molded into ASTM test bars (at 200° C.) using a Newbury 1 ¼ ounce screw injection molding machine. The test bars were measured for the following properties: tensile strength trol W.

The results are shown in Table 10.

EXAMPLE 21

20 weight percent of the blend of polyarylate and poly(ethylene terephthalate) described above was blended with 80 weight percent of the polyurethane, Texin 355 DXH, described in Control X.

The blend was prepared by extrusion blending the components at about 210°-220° C. in a single screw 1-inch diameter extruder with L/D=36/1. The extrudate was chopped into pellets. The pelletized product was molded into test bars and tested by the procedures as described in Control W.

The results are shown in Table 10.

EXAMPLE 22

The procedure of Example 21 was exactly repeated except that 40 weight percent of the blend of polyarylate and poly(ethylene terephthalate) and 60 weight percent of the polyurethane were used.

The results are shown in Table 10.

CONTROL Y

A thermoplastic polyurethane (Pellethane 2102-55D sold by Upjohn Company and having the mechanical properties described in Table 10) was injection molded into test bars and tested by the procedures as described in Control W.

The results are shown in Table 10.

EXAMPLE 23

40 weight percent of the blend of polyarylate and poly(ethylene terephthalate) described above was blended with 60 weight percent of the polyurethane, Pellethane 2102-55D, described in Control Y.

The blend was prepared by extrusion blending the components at about 200°-210° C. in a single screw 1-inch diameter extruder with L/D=36/1. The extrudate was chopped into pellets. The pelletized product was molded into test bars and tested by the procedures as described in Control W.

The results are shown in Table 10.

The data in Table 10 shows that the addition of polyarylate/poly(ethylene terephthalate) blends to thermoplastic polyurethanes yields higher modulus products while retaining good strength and ultimate elongation. This method of polymeric reinforcement offers distinct advantages over inorganic filler or fiber reinforcement. Commercially, the maximum tensile modulus of unreinforced thermoplastic polyurethanes is 20,000 psi. The terpolymer of this invention yields improved load bearing properties including lower creep and lower deformation under load.

TABLE 10

| | | | | Testing Rate | | | |
|---|---|---|---|---|---|---|---|
| | | | | Two inch/min. | | Twenty inch/min. | |
| | Description of the Composition[1] | | Tensile Modulus | Tensile Strength | Elongation | Tensile Strength | Elongation |
| Example | Polymer | (wt.%) | (psi) | (psi) | (percent) | (psi) | (percent) |
| Control W | PU[a] | 100 | 6,900 | 7,240 | 465 | 4,850 | 563 |
| 19 | PA (60) PE (40) PU[a] | 20 80 | 8,900 | 6,010 | 455 | 3,480 | 520 |
| 20 | PA (60) PE (40) PU[a] | 40 60 | 24,200 | 4,710 | 300 | 3,570 | 268 |
| Control X | PU[b] | 100 | 10,900 | 4,550 | 298 | 3,010 | 342 |
| 21 | PA (60) PE (40) PU[b] | 20 80 | 19,500 | 5,630 | 288 | 4,060 | 305 |
| 22 | PA (60) PE (40) PU[b] | 40 60 | 53,300 | 5,110 | 212 | 4,320 | 200 |
| Control Y | PU[c] | 100 | 14,800 | 8,780 | 372 | 7,210 | 437 |
| 23 | PA (60) PE (40) PU[c] | 40 60 | 63,100 | 7,050 | 268 | 5,150 | 257 |

[1] PA = polyarylate
[a] = Pellethane 2102-80A
PE = poly(ethylene terephthalate)
[b] = Texin 355 DXH
PU = polyurethane
[c] = Pellethane 2102-55D

CONTROL Z

A thermoplastic polyurethane (Pellethane 2102-55D sold by Upjohn Company and having the mechanical properties described in Table 11) was compression molded into samples at 210° C. in a 4×4×0.20 inch mold cavity into test samples. These samples were exposed in an artificial weathering unit for 500, 1000 and 2000 hours by the procedure as described in ASTM-D-1499. From the exposed specimens, ⅛ inch wide specimens were shear cut to determine the tensile strength according to a procedure similar to ASTM D-638. The initial tensile strength after molding is shown in Table II and the percent of the retention of the tensile strength of the samples is reported after 500, 1000 and 2000 hours of exposure in the weathering unit (Weatherometer).

The results are shown in Table 11.

Preparation of blend of polyarylate and poly(ethylene terephthalate): 60 weight percent of polyarylate, Ardel-D-100, was blended with 40 weight percent of poly(ethylene terephthalate) having an intrinsic viscosity of 0.64 as measured in a 60/40 1,1,2,2-tetrachlorethane/phenol mixture at 25° C.

The blend was prepared by extrusion blending the components at 270° C. into pellets in a single screw 1-inch diameter extruder with L/D=36/1.

EXAMPLE 24

10 weight percent of the blend of polyarylate and poly(ethylene terephthalate) described above was blended with 90 weight percent of the polyurethane, Pellethane 55D, described in Control Z.

The blend was prepared by mixing the components in a Brabender blender at about 210°-230° C. The product was tested by the procedure of Control Z.

The results are shown in Table 11.

EXAMPLE 25

The procedure of Example 24 was exactly repeated except that 20 weight percent of the blend of polyarylate and poly(ethylene terephthalate) and 80 weight percent of the polyurethane were used.

The results are shown in Table 11.

The data in the Table show improved retention of tensile strength after artificial weathering exposure with addition of low levels of polyarylate. The addition of the polyarylate/poly(ethylene terephthalate) blend to the thermoplastic polyurethane did not detract from the excellent tensile strength exhibited by the thermoplastic polyurethane.

EXAMPLE 26

20 weight percent of the polyarylate/poly(ethylene terephthalate) blend prepared above was blended with 80 weight percent of the block copolymer (Hytrel 5555) described in Control AA.

The blend was prepared by extrusion blending the components into pellets at 220°-230° C. in a single screw 1-inch diameter extruder with L/D=36/1. The pellets were injection molded into ASTM test bars and tested by the procedures described in Control AA.

The results are shown in Table 12.

EXAMPLE 27

Example 26 was exactly repeated except that 40 weight percent of the polyarylate/poly(ethylene terephthalate) blend and 60 weight percent of the block copolymer (Hytrel 5555) was used.

The results are shown in Table 12.

CONTROL BB

A poly(butylene terephthalate)-polytetrahydrofuran $(AB)_n$ block copolymer (Hytrel 6345 sold by E. I. du Pont Company and having the mechanical properties listed in Table 12) was injection molded into ASTM test bars and tested by the procedures described in Control AA.

TABLE 11

| | | | | Testing Rate | | | | Retention of Initial Tensile Strength (%) after Exposure in Weatherometer for: | | |
|---|---|---|---|---|---|---|---|---|---|---|
| | | | | Two inch/min. | | Twenty inch/min. | | | | |
| | Description of Composition[1] | | Tensile Modulus | Tensile Strength | Elongaton | Tensile Strength | Elongation | Initial Tensile Strength | | | |
| Example | Polymer | (wt.%) | (psi) | (psi) | (percent) | (psi) | (percent) | (psi) | 500 | 1000 | 2000(hrs) |
| Control Z | PU | 100 | 14,800 | 10,500 | 528 | 8,860 | 427 | 10,500 | 44 | 35 | 22 |
| 24 | PA (60) PET (40) | } 10 | 20,300 | 10,200 | 502 | 9,190 | 431 | 10,200 | 66 | 49 | 24 |
| | PU | 90 | | | | | | | | | |
| 25 | PA (60) PET (40) | } 20 | 26,800 | 10,200 | 658 | 7,990 | 372 | 10,200 | 73 | 39 | 31 |
| | PU | 80 | | | | | | | | | |

[1]PU = polyurethane
PA = polyarylate
PET = poly(ethylene terephthalate)

CONTROL AA

A poly(ether-ester) $(AB)_n$ block copolymer (Hytrel 5555 sold by E. I. du Pont Company and having the mechanical properties listed in Table 12) was injection molded into ASTM test bars (at 220°-230° C.) using a Newbury 1¼ ounce screw injection molding machine. The test bars were measured for the following properties: tensile strength and modulus according to ASTM D-638, and elongation at break according to ASTM D-638.

The results are shown in Table 12.

Preparation of Blend of Polyarylate and Poly(ethylene terephthalate)

60 weight percent of polyarylate, Ardel D-100 was blended with 40 weight percent of poly(ethylene terephthalate) having an intrinsic viscosity of 0.64 as measured in a 60/40 1,1,2,2-tetrachloroethane/phenol mixture at 25° C.

The blend was prepared by extrusion blending the components into pellets at 270° C. in a single screw 1-inch diameter extruder with L/D=36/1.

The results are shown in Table 12.

EXAMPLE 28

20 weight percent of the polyarylate/poly(ethylene terephthalate) blend prepared above was blended with the block copolymer (Hytrel 6345) described in Control BB.

The blend was prepared by extrusion blending the components into pellets at 220°-230° C. in a single screw 1-inch diameter extruder with L/D=36/1. The pellets were injection molded into ASTM bars and tested by the procedures described in Control AA.

The results are shown in Table 12.

EXAMPLE 29

Example 28 was exactly repeated except that 40 weight percent of the polyarylate/poly(ethylene terephthlate blend and 60 weight percent of the block copolymer (Hytrel 6345) were used.

The results are shown in Table 12.

The data in the Table show that addition of the polyarylate/poly(ethylene terephthalate) blend to the block copolymer results in a significant increase in modulus while maintaining the excellent tensile strength inherent in these block copolymers. The increased modulus will improve the resistance to deformation under load.

The blend was prepared by mixing the components in a Brabender blender at 220°-230° C. The blend was then tested by the procedures described in Control CC.
The results are shown in Table 13.

TABLE 12

| | Description of the Composition | | Tensile Modulus (psi) | Testing Rate | | | |
|---|---|---|---|---|---|---|---|
| | | | | Two inch/min | | Twenty inch/min | |
| Example | Polymer | (wt. %) | | Tensile Strength (psi) | Elongation (percent) | Tensile Strength (psi) | Elongation (percent) |
| Control AA | BC[a] | 100 | 29,600 | 5,800 | 537 | 5,090 | 607 |
| 26 | BC[a] | 80 | 50,600 | 5,010 | 397 | 4,480 | 430 |
| | PA(60) PET(40) } | 20 | | | | | |
| 27 | BC[a] | 60 | 97,600 | 4,910 | 243 | 4,530 | 270 |
| | PA(60) PET(40) } | 40 | | | | | |
| Control BB | BC[b] | | 50,900 | 5,600 | 455 | 4,720 | 440 |
| 28 | BC[b] | 80 | 107,000 | 5,650 | 322 | 4,920 | 485 |
| | PA(60) PET(40) } | 20 | | | | | |
| 29 | BC[b] | 60 | | | | | |
| | PA(60) PET(40) } | 40 | 202,000 | 5,570 | 265 | 4,750 | 60 |

[1]BC = block copolymer
[a] = Hytrel 5555
PA = polyarylate
[b] = Hytrel 6345
PET = poly(ethylene terephthalate)

CONTROL CC

A poly(ether-ester) (AB)$_n$ block copolymer, Hytrel 5555, described in Control AA was compression molded at 230° C. in a 4×4×0.20 inch mold cavity to form 20 mil samples. These samples were exposed in an artificial weathering unit for 500 and 1000 hours by the procedure as described in ASTM D-1499. From the exposed specimens, ⅛ inch wide specimens were shear cut to determine the tensile strength according the procedure of ASTM D-638. The initial tensile strength after molding is shown in Table 13 and the percent of the retention of the tensile strength of the samples is reported after 500 and 1000 hours of exposure in the weathering unit (Weathermometer).
The results are shown in Table 13.

PREPARATION OF A BLEND OF POLYARYLATE AND POLY(ETHYLENE TEREPHTHALATE)

60 weight of polyarylate, Ardel-D-100, was blended with 40 weight percent of poly(ethylene terephthalate) having an intrinsic viscosity of 0.64 as measured in a 60/40 1,1,2,2-tetrachloroethane/phenol mixture at 25° C.
The blend was prepared by extrusion blending the components at 270° C. into pellets in a single screw 1-inch diameter extruder with L/D=36/1.

EXAMPLE 30

10 weight percent of the polyarylate/poly(ethylene terephthalate) blend prepared above was blended with 90 weight percent of the block copolymer (Hytrel 5555) described in Control CC.

EXAMPLE 31

Example 31 was exactly repeated except that 20 weight percent of the polyarylate/poly(ethyleneterephthalate) blend and 80 weight percent of the block copolymer (Hytrel 5555) was used.
The results are shown in Table 13.

CONTROL DD

A poly(butylene terephthalate)-polytetrahydrofuran (AB)$_n$ block copolymer, Hytrel 6345, described in Control BB was compression molded and tested by the procedure described in Control CC.
The results are shown in Table 13.

EXAMPLE 32

10 weight percent of the polyarylate/polyethylene terephthalate) blend prepared above was blended with 90 weight percent of the block copolymer (Hytrel 6345) described in Control DD.
The blend was prepared by mixing the components in a Brabender blender at 220°-230° C. the blend was then tested by the procedure described in Control CC.
The results are shown in Table 13.

EXAMPLE 33

Example 32 was exactly repeated except that 20 weight percent of the polyarylate/poly(ethyleneterephthalate) blend and 80 weight percent of the block copolymer (Hytrel 6345) was used.
The results are shown in Table 13.
The results in the Table show that the block copolymers degrade very rapidly under the test conditions. The addition of a blend of polyarylate/poly(ethyleneterephthalate) to the block copolymer results in improved tensile strength retention of the poly(etherester) block copolymer after weathering.

TABLE 13

| Example | Description of the Composition Polymer | (wt. %) | Initial tensile strength (psi) | Retention of Initial Tensile Strength (%) After Exposure in Weatherometer for | |
|---|---|---|---|---|---|
| | | | | 500 | 1000 (hrs) |
| Control CC | BC[a] | 100 | 7710 | 8.3 | 0 |
| 30 | BC[a] | 90 | 5750 | 18.4 | 14.6 |
| | PA(60) PET(40) | 10 | | | |
| 31 | BC[a] | 80 | 5160 | 37.0 | 22.7 |
| | PA(60) | 20 | | | |
| | PET(40) | | | | |
| Control DD | BC[b] | 100 | 7790 | 25.6 | 11.8 |
| 32 | BC[b] | 90 | 6790 | 17.2 | 17.4 |
| | PA(60) PET(40) | 10 | | | |
| 33 | BC[b] | 80 | 6940 | 27.8 | 21.8 |
| | PA(60) | 20 | | | |
| | PET(40) | | | | |

[1]BC = block copolymer
[a] = Hytrel 5555
PA = polyarylate
[b] = Hytrel 6345
PET = poly(ethylene terephthalate)

CONTROL EE 100 weight percent of poly(vinyl chloride) having an inherent viscosity of 0.78 (as measured by ASTM-D1243, Method A) (QSAH-7 sold by Union Carbide Corporation) was mixed with 4 parts by weight of an organo tin thermal stabilizer (TM-181 sold by Cincinnati Milacron). This mixture was compression molded at 180° C. in a 4×4×0.20 inch mold cavity to form 20 mil samples. These samples were exposed to an artificial weathering unit for 500 and 1000 hours by the procedure as described in ASTM D-1499. From the exposed specimens, ⅛ inch wide specimens were shear cut to determine the tensile strength according to the procedure of ASTM D-638. The initial tensile strength after molding is shown in Table 14 and the percent of the retention of the tensile strength of the samples is reported after 500 and 1000 hours of exposure in the weathering unit (Weatherometer). The color of the sample after 1000 hours of exposure is also shown.

The results are shown in Table 14.

PREPARATION OF A BLEND OF POLYARYLATE AND POLY(ETHYLENE TEREPHTHALATE)

60 weight percent of polyarylate, Ardel D-100, was blended with 40 weight percent of poly(ethylene terephthalate) having an intrinsic viscosity of 0.64 as measured in a 60/40 1,1,2,2-tetrachloroethane/phenol mixture at 25° C.

The blend was prepared by extrusion blending the components at 270° C. into pellets in a single screw 1-inch diameter extruded with L/D=36/1.

EXAMPLE 34

10 parts by weight of the polyarylate/poly(ethylene terephthalate) blend prepared above was blended with the mixture of 100 parts by weight of the poly(vinyl chloride) and 4 parts by weight of the stabilizer as described in Control EE.

The blend was prepared by blending the two premixed blends on a two roll mill at 170°–180° C. roll temperature. The blend was then tested by the procedure described in Control EE.

The results are shown in Table 14.

EXAMPLE 35

Example 34 was exactly repeated except that 20 parts by weight of the polyarylate/poly(ethylene terephthalate) blend was used.

The results are shown in Table 14.

CONTROL FF 100 parts by weight of the poly(vinyl chloride) (QYSA sold by Union Carbide Corporation) having an inherent viscosity of 0.63 (as measured by ASTM D-1243, Method A) was mixed with 4 parts by weight of a thermal stabilizer (TM-181) described in Control EE. The mixture was compression molded and tested by the procedure described in Control EE.

The results are shown in Table 14.

EXAMPLE 36

20 parts by weight of the polyarylate/poly(ethylene terephthalate) blended prepared above was blended with a mixture of 100 parts by weight of poly(vinyl chloride) and 4 parts by weight of the stabilizer as described in Control EE.

The blend was prepared by blending the two premixed blends on a two roll mill at 170°–180° C. roll temperature. The blend was then tested by the procedure described in Control EE.

The results are shown in Table 14.

The results in the Table show that the ternary blends of polyarylate/poly(ethylene terephthalate) and poly(vinyl chloride), according to this invention have improved retention of tensile strength and also exhibit lower discoloration after exposure of 1000 hours in comparison to the poly(vinyl chloride).

TABLE 14

| Example | Description of the Composition Polymer | (Parts by wt.) | Initial Tensile strength (psi) | Retention of Initial Impact Strength (%) After Exposure in Weatherometer for | | Color of Sample After 1000 hrs Exposure |
|---|---|---|---|---|---|---|
| | | | | 500 | 1000 (hrs) | |
| Control EE | PVC[a] | 100 | 7620 | 104 | 93 | Brown |
| 34 | PVC[a] | 100 | 6990 | 109 | 109 | Light yellow |

TABLE 14-continued

| Example | Description of the Composition Polymer | (Parts by wt.) | Initial Tensile strength (psi) | Retention of Initial Impact Strength (%) After Exposure in Weatherometer for | | Color of Sample After 1000 hrs Exposure |
|---|---|---|---|---|---|---|
| | | | | 500 | 1000 (hrs) | |
| 35 | PA(60) PET(40) PVC$^{(a)}$ | 10 100 | 7040 | 108 | 118 | Light yellow |
| Control FF | PA(60) PET(40) PVC$^{(b)}$ | 20 100 | 6980 | 114 | 65 | Brown |
| 36 | PVC$^{(b)}$ PA(60) PET(40) | 100 20 | 6440 | 97 | 89 | Light yellow |

$^1$PVC = poly(vinyl chloride)
$^{(a)}$ = QSAH-7 poly(vinyl chloride)
PA = polyarylate
$^{(b)}$QYSA poly(vinyl chloride)
PET = poly(ethylene terephthalate)

EXAMPLE 37

50 weight percent of poly(hydroxy ether) having a reduced viscosity of 0.41 as measured in methylene chloride (Phenoxy PKHH sold by Union Carbide Corporation) was blended with 33.5 weight percent of polyarylate, Ardel D-100, and 16.5 weight percent of a copolyester, PETG-6763 (a copolyester prepared by the reaction of cyclohexanedimethanol and ethylene glycol with terephthalic acid, in a molar ratio of 1:2:3. This polyester has a $M_n$ of about 26,000 and is sold by Tennessee Eastman Company).

The blend was prepared by extrusion blending the components at 265° C. in a single screw 1-inch diameter extruder with L/D=36/1. The extrudate was chopped into pellets. The pelletized product was injected molded into ASTM test specimens (250°-265° C.) using a Newbury 1¼ ounce screw injection molding machine. The test specimens were measured for the following properties: tensile strength and modulus according to ASTM D-638; elongation at break according to ASTM D-638; and notched izod impact strength according to ASTM D-256. The results are shown in Table 15 as follows:

TABLE 15

| | |
|---|---|
| Tensile modulus (psi) | 409,000 |
| Tensile strength (psi) | 10,100 |
| Elongation (%) | 45 |
| Notched Izod Impact Strength (ft. lbs./in. of notch) | 1.1 |

Blends of poly(hydroxy ether) and polyarylate are very difficult to prepare and injection mold due to the potential of crosslinking due to transesterification. However, the addition of a copolyester to the poly(hydroxy ether) and polyarylate allows for sufficient blending and fabrication lattitude for forming injection molded articles. The ternary blend has good mechanical properties.

CONTROL GG

A polyarylate, Ardel D-100, was tested for melt flow by the apparatus and procedure as described in ASTM-D-1238.

The results are shown in Table 16.

CONTROL HH 75 weight percent of polyarylate, Ardel D-100, was blended with 25 weight percent of poly(ethylene terephthalate) having an intrinsic viscosity of 0.64 as measured in a 60/40 1,1,2,2-tetrachloroethane/phenol mixture at 25° C.

The blend was prepared by extrusion blending the components into pellets at 270° C. in a single screw 1-inch diameter extruder with L/D=36/1. The blend was tested for melt flow according to the procedure described in Control GG.

The results are shown in Table 16.

In the following Controls and Examples the materials identified therein were blended together by extrusion blending the components into pellets at 260°-280° C. in a single screw 1-inch diameter extruder with L/D=36/1. The blends were then tested for melt flow according to the procedure described in Control GG.

CONTROL II 70 weight percent of polyarylate, Ardel D-100 was blended with 30 weight percent of K-2938 described in Control L.

EXAMPLE 38

70 weight percent of the polyarylate/poly(ethylene terephthalate) blend of Control HH was blended with 30 weight percent of the ABS (K-2938) of Control II.

CONTROL JJ 60 weight percent of polyarylate, Ardel D-100 was blended with 40 weight percent of the ABS (K-2938) of Control II.

EXAMPLE 39

60 weight percent of the polyarylate/poly(ethylene terephthalate) blend of Control HH was blended with 40 weight percent of the ABS (K-2938) of Control II.

CONTROL KK 70 weight percent of polyarylate, Ardel D-100, was blended with 30 weight percent of poly(methyl methacrylate) grated onto a butadiene based rubber (Plexiglas DR described in Control T).

EXAMPLE 40

70 weight percent of the polyarylate/poly(ethylene terephthalate) blend of Control HH was blended with 30 weight percent of poly(methyl methacrylate) described in Control KK.

CONTROL LL 60 weight percent of polyarylate, Ardel D-100, was blended with 40 weight percent of poly(methyl methacrylate) described in Control KK.

EXAMPLE 41

60 weight percent of the polyarylate/poly(ethylene terephthalate) blend of Control HH was blended with 40 weight percent of poly/methyl methacrylate) described in Control KK.

CONTROL MM 50 weight percent of polyarylate, Ardel D-100, was blended with 50 weight percent of polysulfone having a reduced viscosity of 0.48 as measured in chloroform at 25° C. (0.2 g/dl) (P-1700 sold by Union Carbide Corporation).

EXAMPLE 42

50 weight percent of the polyarylate/poly(ethylene terephthalate) blend of Control HH was blended with 50 weight percent of the polysulfone of Control MM.

The results are shown in Table 16.

The data in the Table shows that the ternary blends of this invention have improved processability as shown by the increased melt flow. Increased melt flow results in a lower injection molding temperature.

TABLE 16

| Example | Description of the Composition Polymer | (wt %) | Melt Flow (dg./min) at 300° C. |
|---|---|---|---|
| Control GG | PA | 100 | 0.38 |
| Control HH | PA | 75 | 3.4 |
|  | PET | 25 |  |
| Control II | PA | 70 | 2.8 |
|  | ABS | 30 |  |
| 38 | PA(75) |  |  |
|  | PET(25) | 70 | 8.9 |
|  | ABS | 30 |  |
| Control JJ | PA | 60 | 3.1 |
|  | ABS | 40 |  |
| 39 | PA(75) |  |  |
|  | PET(25) | 60 | 13.3 |
|  | ABS | 40 |  |
| Control KK | PA | 70 | 3.6 |
|  | PMMA | 30 |  |
| 40 | PA(75) |  |  |
|  | PET(25) | 70 | 36.8 |
|  | PMMA | 30 |  |
| Control LL | PA | 60 | 13.1 |
|  | PMMA | 40 |  |
| 41 | PA(75) |  |  |
|  | PET(25) | 60 | 42.6 |
|  | PMMA | 40 |  |
| Control MM | PA | 50 | 1.4 |
|  | PS | 50 |  |
| 42 | PA(75) |  |  |
|  | PET(25) | 50 | 4.5 |
|  | PS | 50 |  |

[1] PA = polyarylate
PET = poly(ethylene terephthalate)
ABS = K-2938
PMMA = poly(methyl methacrylate)
PS = polysulfone

PREPARATION OF A BLEND OF POLYCARBONATE, POLY(ETHYLENE TEREPHTHALATE) AND POLYARYLATE 33 weight percent of polycarbonate (Lexan 101 described in Control A) was blended with 33 weight percent of poly(ethylene terephthalate) having an intrinsic viscosity of 1.04 as measured in 60:40 phenol/tetrachloromethane mixture at 23° C., and 34 weight percent of polyarylate, Ardel D-100.

The blend was prepared by extrusion blending the components at 290° C. in a single screw 1-inch diameter extruder with L/D=36/1. The extrudate was chopped into pellets.

EXAMPLE 43

55 weight percent of the blend of polycarbonate, polyarylate and poly(ethylene terephthalate) prepared above was blended with 45 weight percent of ABS (K-2938 described in Control L).

The blend was prepared by extrusion blending the components at 270° C. in a single screw 1-inch diameter extruder with L/D=36/1. The extrudate was chopped into pellets. The pelletized product was then injection molded into ASTM test specimens (at 270° C.) using a Newbury 1¼ ounce screw injection molding machine. The test specimens were measured for the following properties: tensile strength and modulus according to ASTM D-638, elongation at break according to ASTM D-638; tensile impact strength according to ASTM D-1822 and notched izod impact strength according to ASTM D-256.

The results are shown in Table 17.

EXAMPLE 44

55 weight percent of the blend of polycarbonate, polyarylate and poly(ethylene terephthalate) prepared above was blended with 45 weight percent of poly(methyl methacrylate) grafted onto a butadiene based rubber (Plexiglas DR as described in Control T). The blend was prepared by the procedure described in Example 43. The product was pelletized, molded into test bars and tested by the procedures described in Example 43.

The results are shown in Table 17.

EXAMPLE 45

90 weight percent of the blend of polycarbonate, polyarylate, and poly(ethylene terephthalate) prepared above was blended with 10 weight percent of KM-611 (a styrene/acrylate/butadiene terpolymer having a tensile modulus of 43,600 psi and sold by Rohm and Haas Company). The blend was prepared by the procedure described in Example 43. The product was pelletized, molded into test bars and tested by the procedures described in Example 43.

The results are shown in Table 17.

TABLE 17

| Example | Description of the Composition Polymer | (wt. %) | Tensile Modulus (psi) | Tensile Strength (psi) | Elongation (percent) | Tensile Impact Strength (ft. lbs/in$^2$) | Notched Izod Impact Strength (ft. lbs/in. of Notch) |
|---|---|---|---|---|---|---|---|
| 43 | PC (33) PET(33) PA (34) | 55 | 315,000 | 7310 | 42 | 72 | 1.2 |
|    | ABS | 45 | | | | | |
| 44 | PC (33) PET(33) PA (34) | 55 | 287,000 | 7560 | 45 | 49 | 1.1 |
|    | PMMA | 45 | | | | | |
| 45 | PC (33) PET(33) PA (34) | 90 | 303,000 | 8360 | 93 | 128 | 13.6 |
|    | KM-611 | 10 | | | | | |

$^1$ABS = K-2938
PMMA = Plexiglas DR
PC = polycarbonate
PET = poly(ethylene terephthalate)
PA = polyarylate

EXAMPLE 46

40 weight percent of a polyacrylate, Ardel D-100 was blended with 20 weight percent of a copolyester of cyclohexanedimethanol, ethylene glycol and terephthalic acid (PETG-6763 described in Control E), 30 weight percent of a poly (methyl methacrylate) grafted onto butadiene based rubber (Pexiglas DR described in Control T and Table 9) and 10 weight percent of a styrene/acrylate/butadiene terpolymer (KM-611 described in Example 47)

This blend was prepared by extrusion blending the components at about 270° C. in a 1-inch diameter extruder with L/D=36/1. The extrudate was chopped into pellets. The pellets were molded into ASTM test specimens (at 270°-300° C.) using a Newbury 1¼ ounce screw injection molding machine. The test specimens were measured for the following properties: tensile strength and modulus according to ASTM D-638; elongation at break according to ASTM D-638; notched izod impact strength according to ASTM D-256; tensile impact strength according to ASTM-D-1822; heat distortion temperature measured at 264 psi on a ⅛ inch thick unannealed test bar according to ASTM D-635.

The results are shown in Table 18

EXAMPLE 47

52.5 weight percent of a polyarylate, Ardel D-100, 17.5 weight percent of a copolyester, PETG-6763 (described in Example 46), 10 weight percent of a styrene/acrylate/butadiene terpolymer (KM-611 described in Example 48) and 20 weight percent of a poly(methyl methacrylate) (XT-375 sold by American Cyanamid).

The blend was prepared as in Example 46 molded into test samples and tested by the procedures as described in Example 46.

The results are shown in Table 18.

EXAMPLE 48

Example 47 was exactly repeated except that 20 weight percent of a poly (methyl methacrylate) (XT-250 sold by American Cyanamid) was substituted for the XT-375 poly (methyl methacrylate).

The results are shown in Table 18.

TABLE 18

| Example | Description of the Composition Polymer | Wt. % | Tensile Modulus (psi) | Tensile Strength (psi) | Elongation (percent) | Tensile Impact Strength (ft. lbs/in$^2$) | Notched Izod Impact Strength (ft. lbs/in of notch) | Heat Distortion Distortion (°C.) |
|---|---|---|---|---|---|---|---|---|
| 46 | PA | 40 | | | | | | |
|    | PE | 20 | 280,000 | 7930 | 58 | 137 | 4.2 | 98 |
|    | DR | 30 | | | | | | |
|    | KM-611 | 10 | | | | | | |
| 47 | PA | 52.5 | | | | | | |
|    | PE | 17.5 | 285,000 | 7730 | 23 | 75 | 1.21 | 99 |
|    | XT-375 | 20 | | | | | | |
|    | KM-611 | 10 | | | | | | |
| 48 | PA | 52.5 | | | | | | |
|    | PE | 17.5 | 297,000 | 7930 | 33 | 85 | 1.53 | 100 |
|    | XT-250 | 20 | | | | | | |
|    | KM-611 | 10 | | | | | | |

$^1$PA = polyarylate
PE = copolyester, PETG-6763
DR = Plexiglas DR

What is claimed is:

1. A molding composition comprising a blend of:
   (a) a polyacrylate derived from at least one dihydric phenol and at least one aromatic dicarboxylic acid;
   (b) a polyester derived from an aliphatic or cycloaliphatic diol, or mixtures thereof; and at least one aromatic dicarboxylic acid; and
   (c) at least one thermoplastic polymer selected from the group consisting of an aromatic polycarbonate, a styrene resin, an alkyl acrylate resin, a polyurethane, a vinyl chloride polymer, a poly(aryl ether), a copolyetherester block copolymer, and a polyhydroxyether.

2. A composition as defined in claim 1 wherein the dihydric phenol is of the formula:

9. A composition as defined in claim 1 wherein the polyester is a copolyester having repeating units of the following formula:

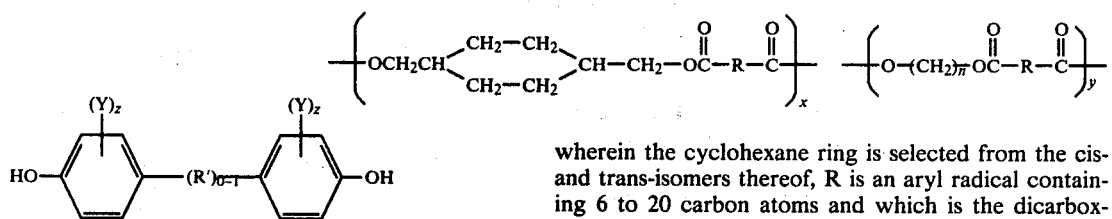

wherein Y is selected from alkyl groups of 1 to 4 carbon atoms, chlorine or bromine, z independently has a value from 0 to 4, inclusive, and R' is a divalent saturated aliphatic hydrocarbon radical selected from alkylene and alkylidene radicals having from 1 to 3 carbon atoms, and cycloalkylene radicals having up to and including 9 carbon atoms.

3. A composition as defined in claim 2 wherein each z is 0 and R' is an alkylidene radical of 3 carbon atoms.

4. A composition as in claim 1 wherein the aromatic dicarboxylic acid in (a) is selected from terephthalic or isophthalic acids, or mixtures thereof.

5. A composition as in claim 1 wherein the polyester has repeating units of the general formula:

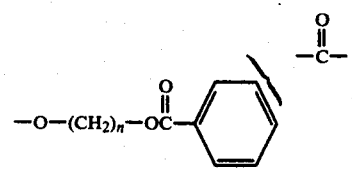

wherein n is an integer of from 2 to 4.

6. A composition as in claim 1 wherein the polyester is poly(ethylene terephthalate).

7. A composition as in claim 1 wherein the polyester has recurring units of the following formula:

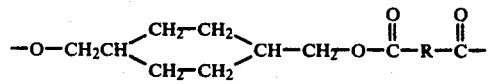

wherein the cyclohexane ring is selected from the cis- and trans-isomer thereof, and R is an aryl radical containing 6 to 20 carbon atoms and which is the decarboxylated residue derived from an aromatic dicarboxylic acid.

8. A composition as in claim 7 wherein the polyester has repeating units of the formula:

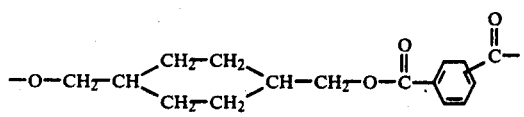

wherein the cyclohexane ring is selected from the cis- and trans-isomers thereof, R is an aryl radical containing 6 to 20 carbon atoms and which is the dicarboxylated residue derived from an aromatic dicarboxylic acid, n is an integer of 2 to 4, x units comprise from about 10 to about 90 percent by weight and the y units comprise from about 10 to about 90 percent by weight.

10. A composition as defined in claim 9 wherein the copolyester has repeating units of the following formula.

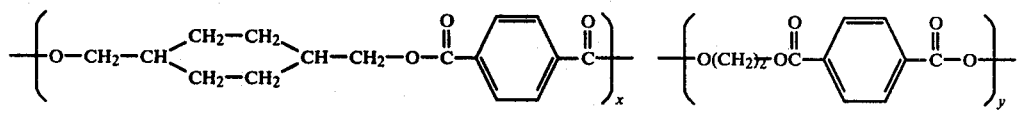

11. A composition as defined in claim 1 which contains from about 4 to about 80 weight percent of (a), from about 4 to about 60 weight percent of (b), and from about 10 to about 92 weight percent of (c).

12. A composition as defined in claim 1 having excellent processability wherein (c) is an aromatic polycarbonate.

13. A composition as defined in claim 12 wherein the aromatic polycarbonate is the reaction product of a dihydric phenol and a carbonate precursor.

14. A composition as defined in claim 13 wherein the dihydric phenol is bisphenol-A and the carbonate precursor is carbonyl chloride.

15. A composition as defined in claim 1 having improved retention of tensile strength after weathering and improved stress crack resistance wherein (c) is a styrene resin.

16. A composition as defined in claim 15 wherein the styrene resin is prepared by polymerizing a conjugated diene monomer or a conjugated diene monomer with a monomer copolymerizable therewith or an acrylic acid ester to provide an elastomeric backbone and thereafter grafting at least one grafting monomer onto said backbone.

17. A composition as defined in claim 16 wherein the conjugated diene monomer is butadiene and the grafting monomer is selected from styrene, an acrylonitrile, an acrylic acid ester, or mixtures thereof.

18. A composition as defined in 17 wherein the styrene resin is a butadiene/styrene/acrylonitrile resin.

19. A composition as defined in claim 1 wherein (c) is an alkyl acrylate resin.

20. A composition as in claim 19 wherein the alkyl acrylate resin is poly(methyl methacrylate).

21. A composition as in claim 20 wherein the alkyl acrylate resin is a copolymer of methyl methacrylate and a vinyl monomer wherein the amount of methyl methacrylate is not less than 70 percent by weight of the copolymer.

22. A composition as defined in claim 21 wherein the vinyl monomer is selected from acrylonitrile, N-allylmaleimide, N-vinylmaleimide or an alkyl acrylate or methacrylate, wherein the alkyl group contains 1 to 8 carbon atoms.

23. A composition as defined in claim 19 wherein the alkyl acrylate resin is alkyl acrylate grafted onto an unsaturated elastomeric backbone, wherein the alkyl acrylate comprises greater than 50 weight percent of the graft copolymer formed.

24. A composition as defined in claim 1 having improved retention of tensile strength after weathering wherein (c) is a polyurethane.

25. A composition as defined in claim 24 wherein the polyurethane is derived from a polyester resin having a molecular weight of at least 600, an organic diisocyanate, and a low molecular weight chain extender having active hydrogen containing groups reactive with isocyanate.

26. A composition as defined in claim 24 wherein the polyurethane is derived from a polyether, an organic diisocyanate, and a low molecular weight chain extender having active hydrogen containing groups reactive with isocyanate.

27. A composition as defined in claim 26 wherein the polyether is selected from polytetramethylene glycol having an average molecular weight between about 600 and 2000, polypropylene glycol and polyethylene glycol having a molecular weight above about 600.

28. A composition as defined in claim 1 having improved retention of tensile strength after weathering wherein (c) is a poly(vinyl chloride) polymer.

29. A composition as defined in claim 28 wherein the poly(vinyl chloride) polymer is a copolymer of vinyl chloride with an olefinically unsaturated polymerisable compound which contains at least 80 percent by weight of vinyl chloride incorporated therein.

30. A composition as defined in claim 1 wherein (c) is a poly(aryl ether).

31. A composition as defined in claim 30 wherein the poly(aryl ether) is composed of recurring units of the formula:

O—E—O—E'— wherein E is the residuum of a dihydric phenol and E' is the residuum of a benzoid compound having an inert electron withdrawing group.

32. A composition as defined in claim 31 wherein the poly(aryl ether) has recurring units having the formula:

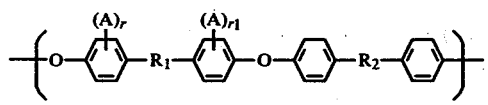

A and $A_1$ can be the same or different inert substituent groups and are selected from alkyl groups having from 1 to 4 carbon atoms, fluorine, chlorine, bromine, iodine, or alkoxy radicals having from 1 to 4 carbon atoms, $R_1$ represents a bond between aromatic carbon atoms or a divalent connecting radical, $R_2$ is sulfone, carboxyl, or sulfoxide, r and $r_1$ are integers having a value of from 0 to 4, inclusive.

33. A composition as defined in claim 32 wherein $R_1$ is a divalent connecting radical of the formula:

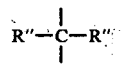

wherein R" represents a member of the group consisting of alkyl, lower aryl and the halogen substituted groups thereof and $R_2$ is a sulfone group.

34. A composition as defined in claim 1 having improved retention of tensile strength after weathering wherein (c) is a copolyetherester block copolymer.

35. A composition as defined in claim 34 wherein the copolyetherester block copolymer consists essentially of a multiplicity of recurring intralinear long chain and short chain ester units connected head-to-tail through ester linkages, said long chain ester units being represented by the following structure:

and said short chain ester units being represented by the following structure

wherein:
G is a divalent radical remaining after removal of terminal hydroxy groups from a poly(alkylene oxide) glycol having a molecular weight of about 400–3500; D is a divalent radical remaining after removal of hydroxyl groups from a low molecular weight diol, and $R_2$ is a divalent radical remaining after removal of carboxyl groups from a dicarboxylic acid; with the provisos that the short chain ester units constitute about 25–65% by weight of the copolyester, at least about 70% of the $R_2$ groups must be 1,4-phenylene radicals, at least about 70% of the D groups must be the 1,4-butylene radicals, and the sum of the percentages of the $R_2$ groups which are not 1,4-phenylene radicals and of the D groups which are not 1,4-butylene radicals cannot exceed about 30%.

36. A composition as defined in claim 1 wherein (c) is a polyhydroxyether.

37. A composition as defined in claim 35 wherein the polyhydroxyether has the general formula

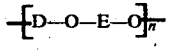

wherein D is the radical residuum of a dihydric phenol, E is a radical residuum of an epoxide selected from mono- and diepoxides and contains from 1 to 2 hydroxyl groups and n is an integer which represents the degree of polymerization and is at least 25.

* * * * *